US009004090B2

(12) United States Patent  (10) Patent No.: US 9,004,090 B2
Asai  (45) Date of Patent: Apr. 14, 2015

(54) SLUICE VALVE FOR OPERATIONS

(75) Inventor: Hisakazu Asai, Itami (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 533 days.

(21) Appl. No.: 13/389,657

(22) PCT Filed: Aug. 6, 2010

(86) PCT No.: PCT/JP2010/063398
§ 371 (c)(1),
(2), (4) Date: Apr. 19, 2012

(87) PCT Pub. No.: WO2011/019000
PCT Pub. Date: Feb. 17, 2011

(65) Prior Publication Data
US 2012/0192962 A1  Aug. 2, 2012

(30) Foreign Application Priority Data
Aug. 10, 2009  (JP) ................................. 2009-185965

(51) Int. Cl.
| E03B 3/00 | (2006.01) |
| F16K 3/02 | (2006.01) |
| E03B 7/00 | (2006.01) |
| E03B 7/08 | (2006.01) |
| F16K 3/18 | (2006.01) |

(Continued)

(52) U.S. Cl.
CPC .............. F16K 3/0218 (2013.01); E03B 7/006 (2013.01); E03B 7/08 (2013.01); F16K 3/18 (2013.01); F16K 3/184 (2013.01); F16K 27/044 (2013.01); F16K 43/00 (2013.01); F16L 41/06 (2013.01)

(58) Field of Classification Search
CPC ....... F16K 3/0272; F16K 3/12; F16K 27/044; F16K 27/047; F16K 43/00; F16K 43/001; F16L 55/105; F16L 41/06

USPC .......... 251/193, 326–329, 356, 367; 137/15.08, 15.09, 15.12–15.1, 15.23, 137/317–319; 138/94, 97
See application file for complete search history.

(56) References Cited

U.S. PATENT DOCUMENTS 5,687,537 A * 11/1997 Noble ............................. 52/849
7,225,827 B2    6/2007 Maichel et al.
(Continued)

FOREIGN PATENT DOCUMENTS

JP    49146534    4/1948
JP    5145703     11/1976
(Continued)

Primary Examiner — Marina Tietjen
(74) Attorney, Agent, or Firm — The Webb Law Firm

(57) ABSTRACT

An operation for securing and coupling a coupling flange and a fluid device mounted through the interior of a valve case of a sluice valve for operations can be performed with good efficiency from the exterior while sufficiently ensuring the external mounting depth of the coupling tube part on the coupling flange and while facilitating the attachment of pulling and securing means and ensuring the attachment strength. A valve element (31) that is freely movable in a direction orthogonal to a pipe axial center and valve operation means (30) for movably operating the valve element (31) are provided to a valve case (32), which is provided with a coupling tube part (32C) that can be externally mounted on a coupling flange of a connecting pipe from the pipe axial center direction; pulling and securing means for pulling and securing the valve case (32) to the coupling flange is disposed on the coupling tube part (32C) of the valve case (32); and an operation recess (32J) for operating a fastener from a rear surface side of the coupling flange is formed in the coupling tube part (32C) of the valve case (32), the fastener being used for securing and coupling the coupling flange and the fluid device that is joined to the coupling flange through a flow channel inside the valve case (32).

15 Claims, 30 Drawing Sheets

(51) Int. Cl.
  *F16K 27/04* (2006.01)
  *F16K 43/00* (2006.01)
  *F16L 41/06* (2006.01)

(56) References Cited

U.S. PATENT DOCUMENTS

2001/0010233 A1* 8/2001 Sato et al. .................... 137/318
2001/0017159 A1  8/2001 Sato et al.

FOREIGN PATENT DOCUMENTS

| JP | 6163080 U | 4/1986 |
| JP | 611051 A | 1/1994 |
| JP | 628434 U | 4/1994 |
| JP | 2000120889 A | 4/2000 |
| JP | 2007309490 A | 11/2007 |
| JP | 2009115296 A | 5/2009 |

* cited by examiner (a)          (b)

SLUICE VALVE FOR OPERATIONS

TECHNICAL FIELD

The present invention relates to a sluice valve for operations mainly used in the case that, e.g., a cover body for sealing off an end part opening of a connecting pipe, or a valve case of a sluice valve or other fluid device is attached to a coupling flange formed on an end part of a branching pipe or another connecting pipe while the flow of a fluid in the pipe is maintained.

BACKGROUND ART

In a conventional sluice valve for operations, a valve element capable of moving in the orthogonal direction in relation to the pipe axial center of the connection pipe, and valve operation means for movably operating the valve element between open and closed valve positions are provided to a valve case, which is provided with a coupling tube part capable of being externally mounted on a coupling flange of the connecting pipe from the pipe axial center direction; and pulling and securing means for pulling and securing the valve case to the coupling flange is disposed on the coupling tube part of the valve case.

The pulling and securing means comprises threading bolts in a plurality of locations in the circumferential direction of the coupling tube part of the valve case, the bolts being provided with a conical pressing surface that can engage with the external peripheral edge of the back surface side of the coupling flange from the outer side in the radial direction of the pipe.

The coupling part of the fluid device mounted through the flow channel inside the valve case of the sluice valve for operations is joined with the coupling flange of the connecting pipe, and the coupling part of the fluid device and the coupling flange of the connecting pipe are secured and coupled when the plurality of bolts, which is an example of a fastener, are threadably operated through the opening of the coupling tube part of the valve case.

CITATION LIST

Patent Literature

Patent Document 1: Japanese Laid-open Utility Model Application No. 49-146534
Patent Document 2: Japanese Utility Model Publication No. 51-045703
Patent Document 3: Japanese Laid-open Patent Application No. 2000-120889

SUMMARY OF INVENTION

Technical Problem

In a conventional sluice valve for operations, a coupling tube part of the valve case is externally mounted on the coupling flange of the connecting pipe from the pipe axial center direction, thereby ensuring a large flow channel inside the valve case that allows passage of a fluid device having a size that corresponds to the coupling flange of the connecting pipe.

It is possible to simplify the structure of the pulling and securing means because the coupling tube part of the valve case can be dually configured as a pulling force-transmitting medium when the valve case is pulled and secured to the coupling flange of the connecting pipe.

On the other hand, the opening end edge of the coupling tube part projects more considerably in the pipe axial center direction than the back surface of the coupling flange of the connecting pipe due to a relationship in which the conical pressing surface of the bolt threaded in an intermediate position in the pipe axial center direction of the coupling tube part of the valve case is made to engage the external peripheral edge of the back surface side of the coupling flange.

For this reason, when the coupling flange of the connecting pipe and the coupling part of the fluid device mounted through the flow channel inside the valve case of the sluice valve for operations are secured and coupled by a plurality of bolts mounted and operated from the opening side of the coupling tube part of the valve case, the bolts must be fastenably operated while the opening of the coupling tube part of the valve case that projects considerably more in the pipe axial center direction than the back surface of the coupling flange is viewed from the pipe axial center direction; and since there are also spatial restrictions, time tends to be required to perform the securing and coupling operation.

In the particular case that the connecting pipe is composed of a branching pipe of the pipe joint which pipe joint is provided with a plurality of divided joint bodies detachably secured and coupled along the circumferential direction of a fluid pipe, and the branching pipe that communicates with a through-hole in the fluid pipe is projectingly disposed on one of the divided joint bodies, the opening end edge of the coupling tube part is in close contact with the external peripheral surface of the divided joint bodies. In order to ensure operation space between the opposing surfaces of the opening end edge of the coupling tube part and the external peripheral surface of the projectingly disposed divided joint bodies, the projecting length of the branching pipe must be increased, which disadvantageously leads to an increase in the size of the pipe joint and other components.

The present invention was devised in view of the foregoing, and a main object of the present invention is to provide a sluice valve for operations that sufficiently ensures the external mounting depth of the coupling tube part in relation to the coupling flange of the connecting pipe, so as to enable efficient and simple securing and coupling operation between the coupling flange of the connecting pipe and the coupling part of the fluid device mounted through the flow channel inside the valve case of the sluice valve for operations while the attachment of the pulling and securing means is facilitated and the attachment strength is ensured.

Solution to Problem

A first aspect of the present invention is a sluice valve for operations in which a valve element that is freely movable in a direction orthogonal to a pipe axial center and valve operation means for movably operating the valve element between a closed valve position and an open valve position are provided to a valve case, which is provided with a coupling tube part that can be externally mounted on a coupling flange of a connecting pipe from the pipe axial center direction; and pulling and securing means for pulling and securing the valve case to the coupling flange is disposed on the coupling tube part of the valve case in a state engaged with the rear surface of the coupling flange, the sluice valve for operations having an operation recess formed on the coupling tube part of the valve case, and adapted for operating a fastener from a rear surface side of the coupling flange, the fastener being used for securing and coupling the coupling flange and a fluid device, which fluid device is joined to the coupling flange through a flow channel inside the valve case.

According to this aspect, when the coupling flange of the connecting pipe and the fluid device joined through a flow channel in the valve case are secured and coupled by a fastener that is mounted and operated from the opening side of the coupling tube part of the valve case in a state in which the coupling tube part of the valve case is externally mounted from the axial center direction on the coupling flange of the connecting pipe, and the valve case is pulled and secured to the coupling flange of the connecting pipe by pulling and securing means disposed in the coupling tube part, the fastener can be readily fastened and operated in an simple orientation from the external side in the radial direction of the coupling tube part of the valve case through an operation recess formed in the coupling tube part, even in a state in which the opening end edge of the coupling tube part of the valve case projects more considerably in the pipe axial center direction than the rear surface of the coupling flange.

Therefore, it is possible to readily perform operations for securing and coupling the coupling flange of the connecting pipe and the fluid device joined thereto through the flow channel inside the valve case with good efficiency in a simple orientation while a configuration is used in which the coupling tube part of the valve case is externally fitted and mounted on the coupling flange of the connecting pipe, the flow channel inside the valve case is enlarged, the structure of the pulling and securing means is simplified, and a strong pulling and securing function in a medium for transmitting the force for pulling a robust coupling tube part is ensured, regardless of the presence of a coupling tube part of the valve case that projects considerably further in accompaniment therewith in the pipe axial center direction than the rear surface of the coupling flange of the connecting pipe.

In a second aspect of the present invention, the connecting pipe is composed of a branching pipe of a pipe joint, the pipe joint being provided with a plurality of divided joint bodies detachably secured and coupled along the circumferential direction of a fluid pipe, and the branching pipe, which communicates with a through-hole in the fluid pipe, being projectingly provided to one of the divided joint bodies.

According to this aspect, when the coupling flange of the branching pipe of the pipe joint externally mounted on the fluid pipe and the fluid device joined through the flow channel inside the valve case are to be secured and coupled by a fastener that is mounted and operated from the opening side of the coupling tube part of the valve case, it is possible to readily fasten and operate the fastener in a simple orientation from the outer side in the radial direction of the coupling tube part through the operation recess formed in the coupling tube part, even when the opening end edge of the coupling tube part of the valve case projects considerably further in the pipe axial center direction than the rear surface of the coupling flange and closely approaches the external peripheral surface of the divided joint body to which the branching pipe is projectingly provided.

Therefore, a large operations space is not required to be ensured between the external peripheral surface of the divided joint bodies and the opening end edge of the coupling tube part of the valve case opposing to the external peripheral surface, and as a result, the projecting length of the branching pipe can be shortened by an equivalent amount and the pipe joint and other components can be reduced in size.

In a third aspect of the present invention, a seal material is detachably mounted on a downstream-side surface among two surfaces of the valve element in the pipe axial center direction, the seal material sealing off a space formed with respect to a valve seat inside the valve case that faces, in the pipe axial center direction, one surface of the valve element in a closed valve position; and the valve case is composed of at least a plurality of divided valve case bodies separably divided in a position in which is formed an opening via which the valve element can be removed to the exterior.

According to this aspect, when the valve element is in the closed valve position, the seal material disposed on one surface on the downstream side of the valve element is pressed into contact with the valve seat inside the valve case in a mode that makes use of water pressure, and the space between the valve element and the valve seat inside the valve case can be sealed with good efficiency. Also, it is possible to readily replace the seal material with good efficiency in an external wide space in the case that the seal material of the valve element is periodically replaced, because the plurality of divided valve case bodies constituting the valve case can be disassembled and the valve element can be removed from the opening in the divided valve case bodies.

In a fourth aspect of the present invention, there is disposed in the valve case pressing means for imparting downstream-oriented pressing and moving force to another upstream side surface of the valve element in the closed valve position to bring the valve element into contact under pressure with the valve seat in the valve case.

According to this aspect, it is possible to reliably provide a seal with good efficiency between the valve element and the valve seat inside the valve case with the aid of the fluid pressure and the downstream pressing and moving force produced by the pressing means.

In a fifth aspect of the present invention, the pulling and securing means is composed of a bolt threaded from the exterior in the radial direction of the pipe in a plurality of locations in the circumferential direction of the coupling tube part; and the operation recess is formed in a medial location between adjacent bolts of the coupling tube part.

According to this aspect, when the coupling flange of the connecting pipe and the fluid device joined thereto through a flow channel inside the valve case are secured and coupled by a fastener mounted and operated from the opening side of the coupling tube part of the valve case, the fastener can be readily fastenably operated in a simple orientation from the external side in the radial direction of the coupling tube part through the operation recess formed in the coupling tube part, even when the opening end edge of the coupling tube part of the valve case projects considerably further in the pipe axial center direction than the rear surface of the coupling flange.

Additionally, the attachment strength of the bolt can be ensured because the operation recess is formed between adjacent bolts of the plurality of bolts constituting the pulling and securing means.

In a sixth aspect of the present invention, the thickness of a first peripheral wall portion of the coupling tube part of the valve case is configured to be greater than the thickness of a second peripheral wall portion, the first peripheral wall portion being formed in the shape of a strip or substantially in the shape of a strip along the pipe axial center direction in a state that includes a location in which the pulling and securing means is attached, and the second peripheral wall portion being formed in the shape of a strip or substantially the shape of a strip along the pipe axial center direction in a state that includes a location in which the operation recess is formed; and an inside surface of the first peripheral wall portion of the coupling tube part and an inside surface of the second peripheral wall portion are formed as an inside peripheral surface having the same inside diameter.

According to this aspect, the thickness of a first peripheral wall portion of the coupling tube part, the first peripheral wall portion being formed in the shape of a strip or substantially in the shape of a strip along the pipe axial center direction in a state that includes the location in which the pulling and securing means is attached, is configured to be greater than the thickness of a second peripheral wall portion, which is formed in the shape of a strip or substantially in the shape of a strip along the pipe axial center direction in a state that includes the location in which the operation recess is formed; and the location in which the valve case is pulled and secured to the coupling flange of the connecting pipe is robustly configured. Nevertheless, the operation for fastening the fastener by way of the operation recess can be readily carried out without interference from the thick first peripheral wall portion because the outside surface of the second peripheral wall portion is positioned further inward in the radial direction of the pipe than the outside surface of the first peripheral wall portion.

In a seventh aspect of the present invention, the first peripheral wall portion is formed in a plurality of locations in the circumferential direction of the coupling tube part of the valve case, the second peripheral wall portion is arranged between adjacent first peripheral wall portions, and the length of the second peripheral wall portion in the circumferential direction is configured to be greater than the length of the operation recess in the circumferential direction.

According to this aspect, the operation for fastening the fastener by way of the operation recess can be more readily carried out without interference from the thick first peripheral wall portion.

DESCRIPTION OF EMBODIMENTS

First Embodiment

Figure 1:
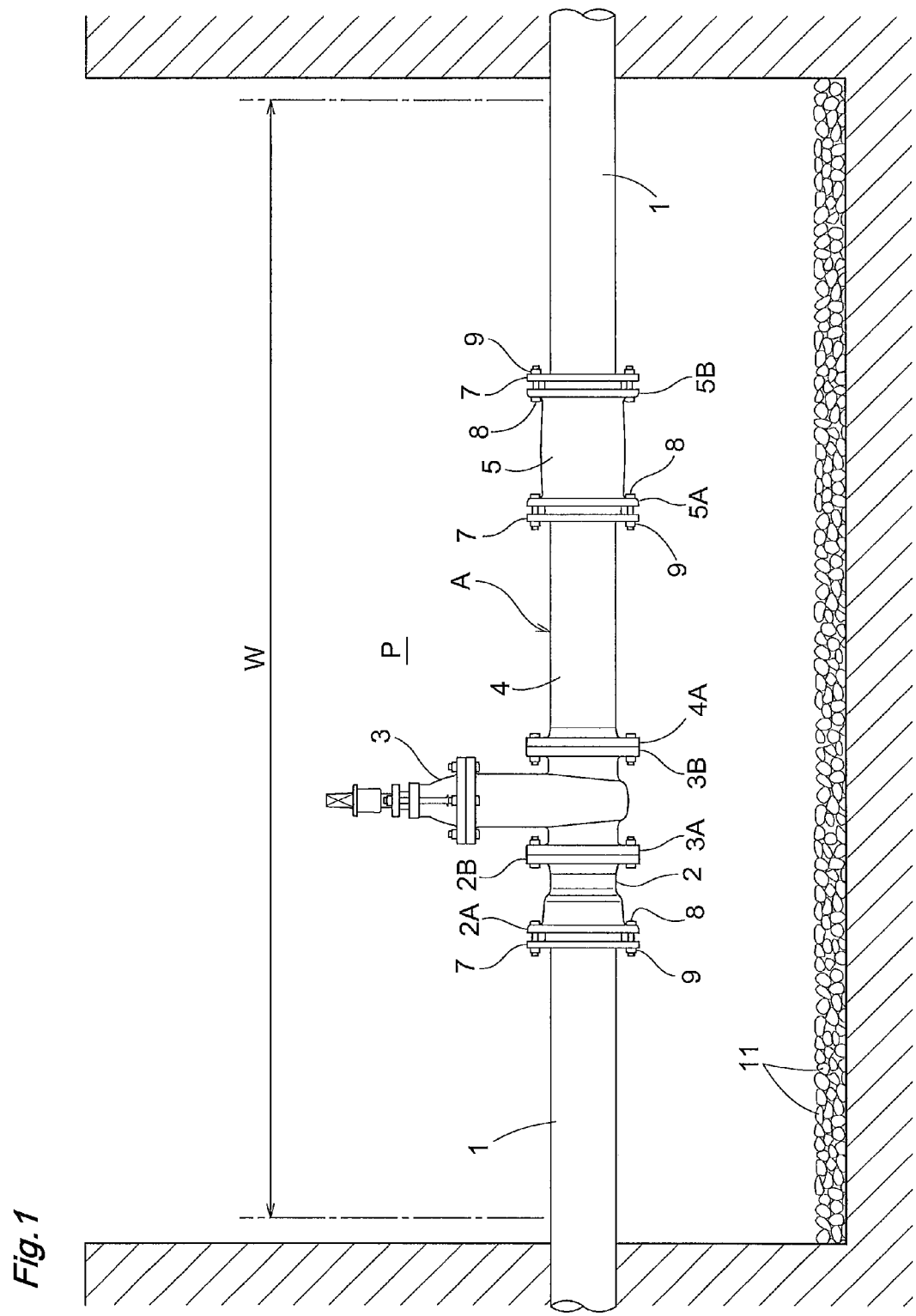
FIG. 1 is an overall side view of an instance when a work pit showing the first embodiment of the present invention is built.

FIGS. 1 to 29 show a renovation method for replacing a to-be-renovated pipeline assembly A as an example of a to-be-renovated pipeline assembly that is embedded in the earth and that constitutes a part of a circulatory piping system in the piping system of a water supply pipe, which is an example of a fluid pipe, with a new pipe assembly B such as that shown in FIGS. 23 to 26 in a state of nonstop water supply in which the flow of a water supply (clean water) is maintained, where the to-be-renovated pipeline assembly A comprises a cast-iron short pipe 2 fittably connected in a watertight state to an end part of one cast-iron water supply pipe 1, a sluice valve 3 that is flange-joined in a water-tight state to the other end part of the short pipe 2, a cast-iron connecting pipe 4 that is flange-joined in a watertight state to another end part of the sluice valve 3, and a collar 5 that connects in a watertight state the other end part of the connecting pipe 4 and the end part of the other cast-iron water supply pipe 1. Following is a description of operations steps, including a structural description of the sluice valve for operations D used in the renovation method.

(1) The operations step of FIG. 1 shows a step for excavating a slightly larger range than a renovation operations area W of the water supply pipe 1 embedded in the earth, and forming a work pit (operations pit) P exposed by the renovation operations area W of the water supply pipe 1; and a step for laying out crushed stone 11 on the bottom surface of the work pit P and a building a stable horizontal operations bottom surface without depressions.

The cross-sectional structure of the to-be-renovated pipeline assembly A is not disclosed in FIG. 1, but the type of sluice valve 3 is the largest point of difference in comparison with the new pipeline assembly B, and the joint structures of the components are otherwise substantially the same.

An example of the joining structure of the to-be-renovated pipeline assembly A will be described with reference to the cross-sectional structure of the new pipeline assembly B shown in FIGS. 23 to 26. A packing 6 is interposed between a tapered internal peripheral surface 2a on the receiving mouth side of the short pipe 2 and the external peripheral surface of one of the water supply pipes 1, and a pressing ring 7 externally mounted on the water supply pipe 1 and a coupling flange 2A of one end of the short pipe 2 are fastenably secured by a bolt 8 and a nut 9, or other fastening means, whereby the packing 6 is compressed to a watertight state by the pressing ring 7.

A coupling flange 2B of the other end of the short pipe 2 and a coupling flange 3A of one end of the sluice valve 3, and a coupling flange 3B on the other end of the sluice valve 3 and a coupling flange 4A of one end of the connecting pipe 4 are secured and coupled in a watertight state by a bolt 8 and nut 9, or other fastening means in a state in which a sheet packing or other seal material is interposed between the flange-joined surfaces.

The packing 6 is interposed between a tapered internal peripheral surface 5a of one end of the collar 5 and the external peripheral surface of the connecting pipe 4, and between a tapered internal peripheral surface 5b of the other end of the collar 5 and the external peripheral surface of the other water supply pipe 1. The pressing ring 7 externally mounted on the connecting pipe 4 and a coupling flange 5A of one end of the collar 5, and the pressing ring 7 externally mounted on the other water supply pipe 1 and a coupling flange 5B of the other end of the collar 5 are each fastenably secured by the bolt 8 and nut 9, or other fastening means. The packing 6 is thereby compressed by the pressing ring 7 until a watertight state is achieved.

A renovation method for replacing the to-be-renovated pipeline assembly A with a new pipeline assembly B provided with substantially the same function is described in this embodiment, but the form and function of the to-be-renovated pipeline assembly A may be completely different from the form and function of the new pipeline assembly B.

Figure 22:
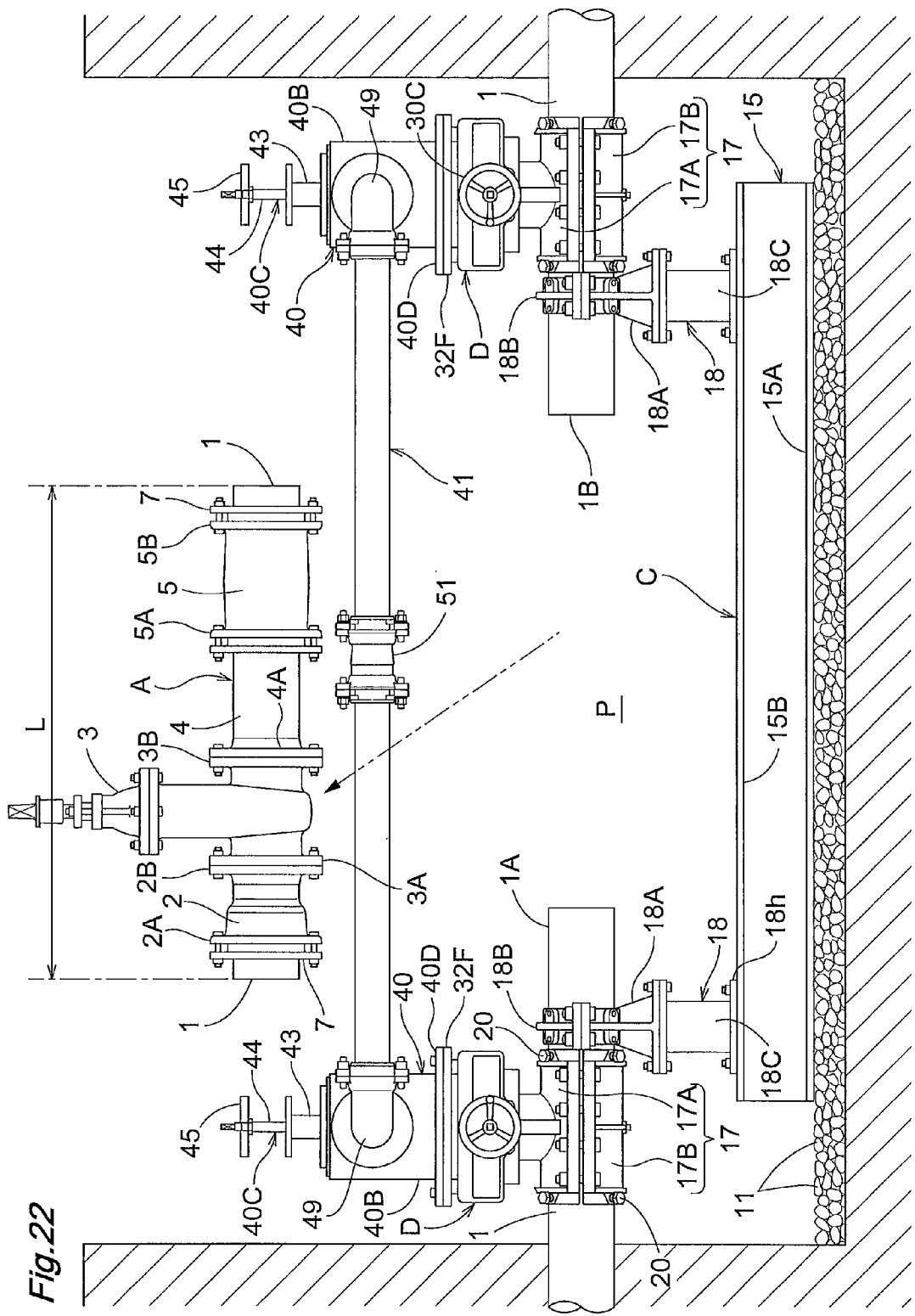
FIG. 22 is an overall side view of an instance when the to-be-renovated pipeline assembly has been separated.

In this embodiment, a part of one of the water supply pipes 1 and a part of the other water supply pipe 1 are cut by a pipe cutting apparatus (not shown), and the to-be-renovated pipeline assembly A is separated and removed from the water supply pipe 1, as shown in FIG. 22. Therefore, the entire length L of the to-be-renovated pipeline assembly A is a dimension that includes the cut pipe parts of the two water supply pipes 1.

Figure 2:
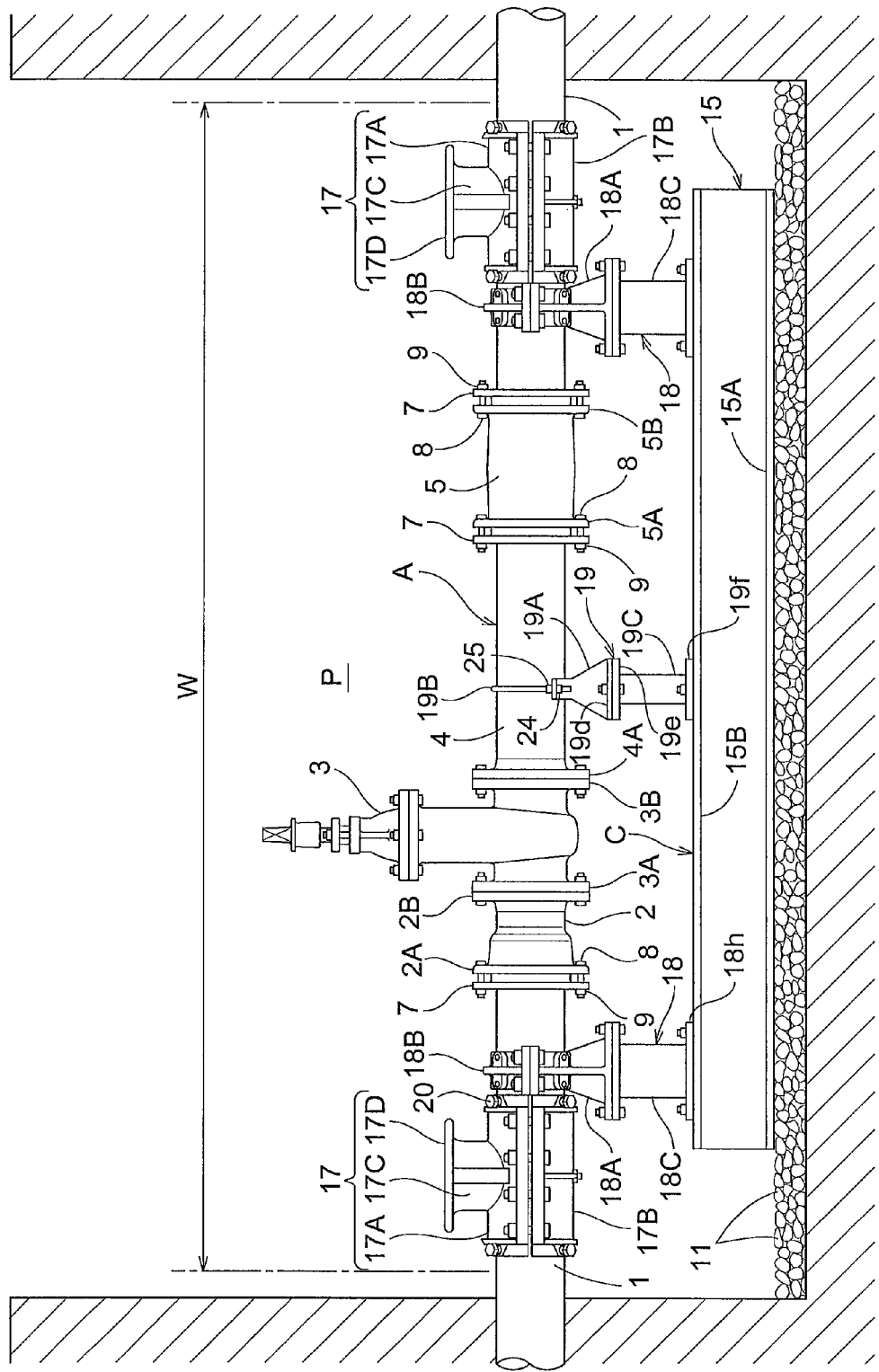
FIG. 2 is an overall side view of an instance when the pipe holders and the pipe supporter are attached to a delivered installation base to constitute a pipe-securing and pipe-supporting apparatus, and when the split T-shaped pipe is attached.
Figure 3:
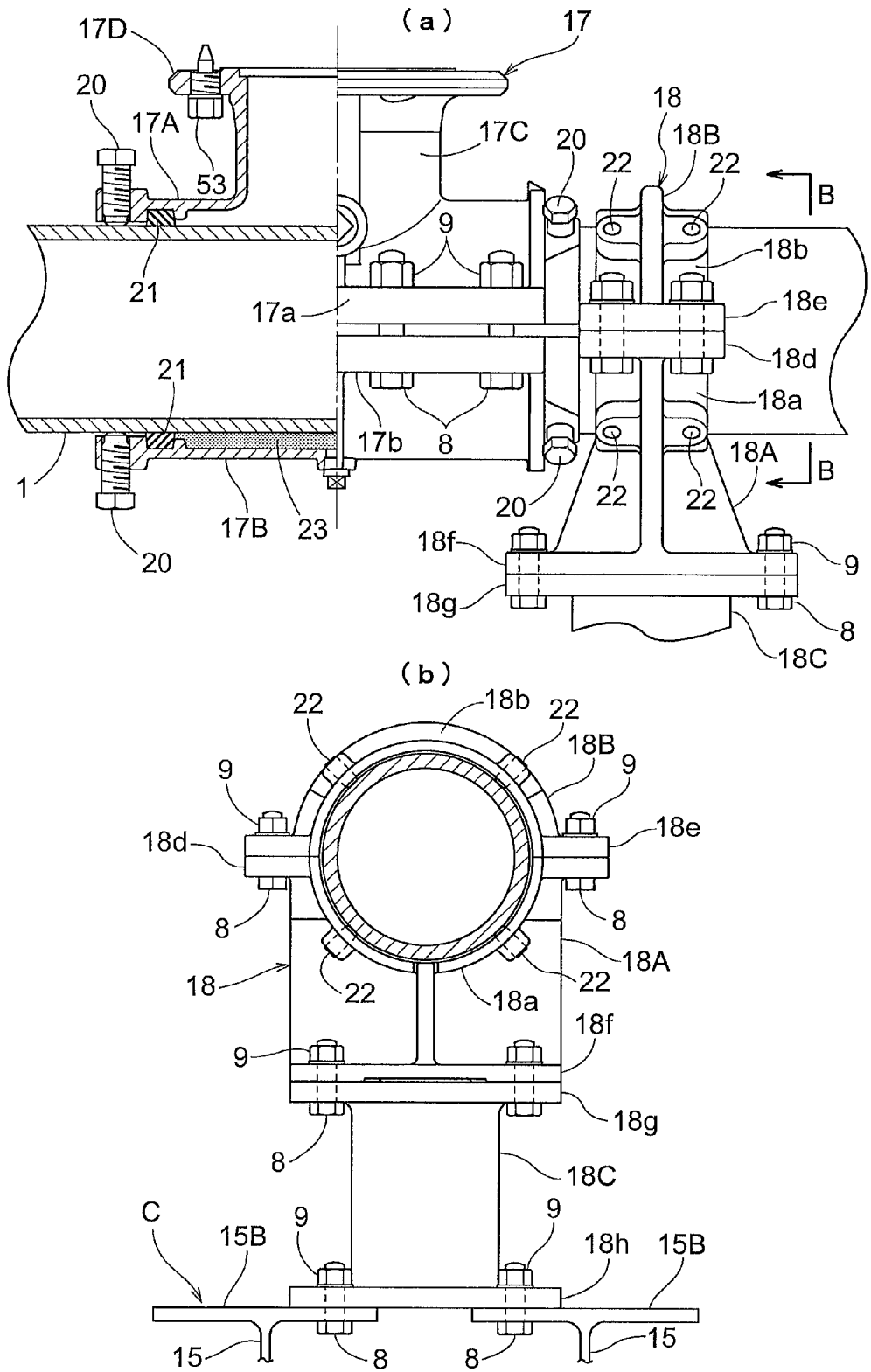
FIG. 3(a) is an enlarged, partially cut-away side view of the split T-shaped pipe and the pipe holder.
FIG. 3(b) is a cross-sectional view along the line B-B in FIG. 3(a)

(2) The operations steps of FIGS. 2 and 3 shows a step for delivering and arranging a metal installation base 15 that is provided with stable grounding properties and rigidity (mechanical strength) that can stop relative approaching movement in the pipe axial center direction of the two remaining pipe parts 1A, 1B of the water supply pipe 1 during separation and removal (see FIG. 22) of the to-be-renovated pipeline assembly A in the operations bottom surface of the work pit P, which is the ground of the to-be-renovated operations location that corresponds to the renovation operations area W of the water supply pipe 1; a step for externally mounting and securing the split T-shaped pipe 17 in two locations at the two ends of the renovation operations area W of the water supply pipe 1, the split T-shaped pipe 17 being bisected at a position along the horizontal surface that passes through or near the pipe axial center of the water supply pipe 1 in an example of a pipe joint provided with a branching pipe 17C in a location that corresponds to a through-hole (example of an opening) 16 formed in the pipe wall of the water supply pipe 1; and a step for securing and coupling to the installation base 15 pipe holders 18 for holding and securing the two locations at the two ends of the renovation operations area W of the water supply pipe 1, and a pipe supporter 19 for supporting the center position in the pipe axial center direction of the to-be-renovated pipeline assembly A in the renovation operations area W of the water supply pipe 1.

The installation base 15 delivery and arrangement step, the split T-shaped pipe 17 external mounting and securing step, the pipe holder 18 attaching step, and the pipe supporter 19 attaching step can be carried out simultaneously, but it is preferred that the installation base 15 be delivered and arranged, the locations that correspond to the renovation operations area W of the water supply pipe 1 be firmly secured and supported by the pipe holders 18 and pipe supporter 19 attached to the installation base 15, and the split T-shaped pipe 17 thereafter be externally mounted and secured to the water supply pipe 1.

Figure 4:
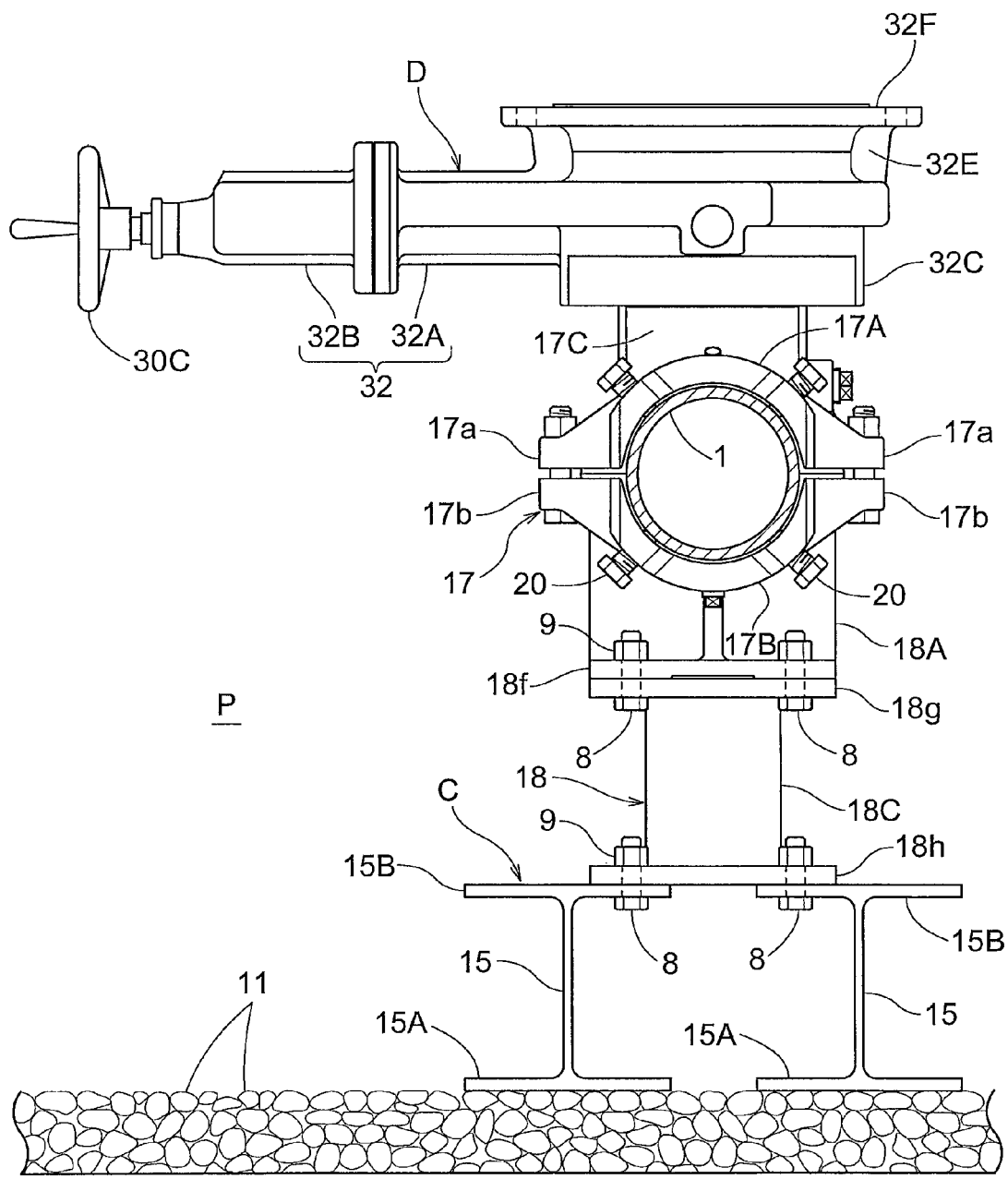
FIG. 4 is a cross-sectional front view of an instance when the sluice valve for operations has been attached.
Figure 5:
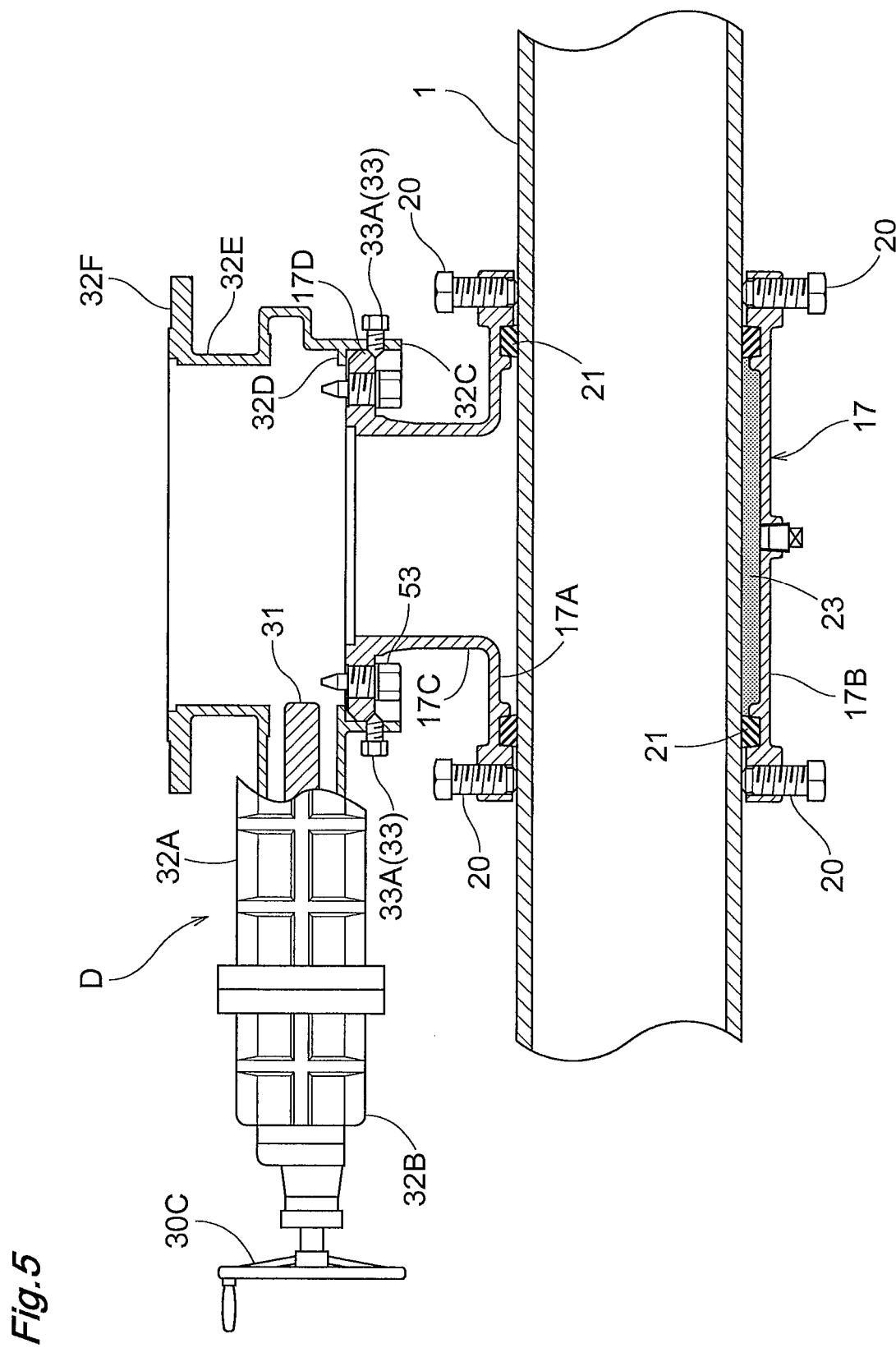
FIG. 5 is an enlarged cross-sectional side view of the split T-shaped pipe and the sluice valve for operations.
Figure 6:
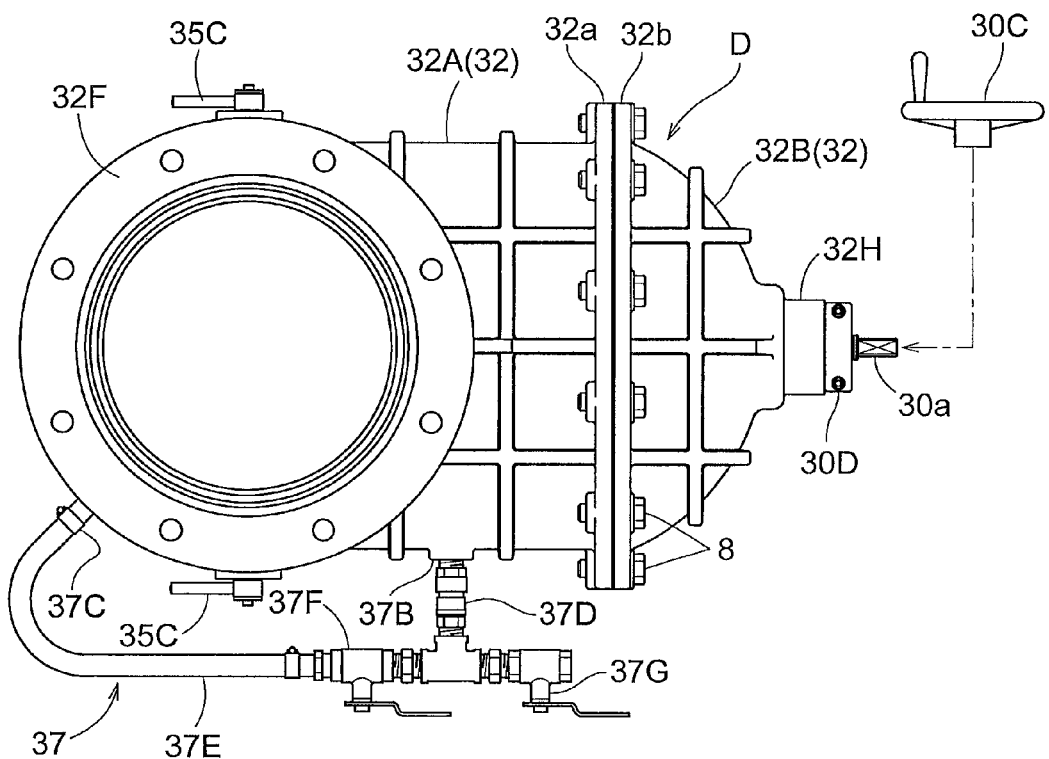
FIG. 6 is a plan view of the sluice valve for operations.
Figure 7:
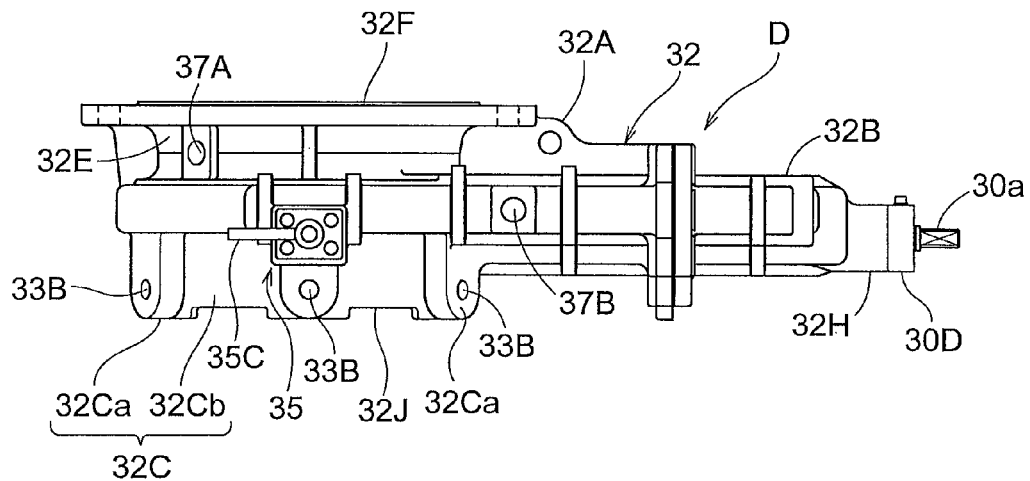
FIG. 7 is a right side view of the sluice valve for operations of an instance when the flow channel pressure adjustment means has been removed.
Figure 8:
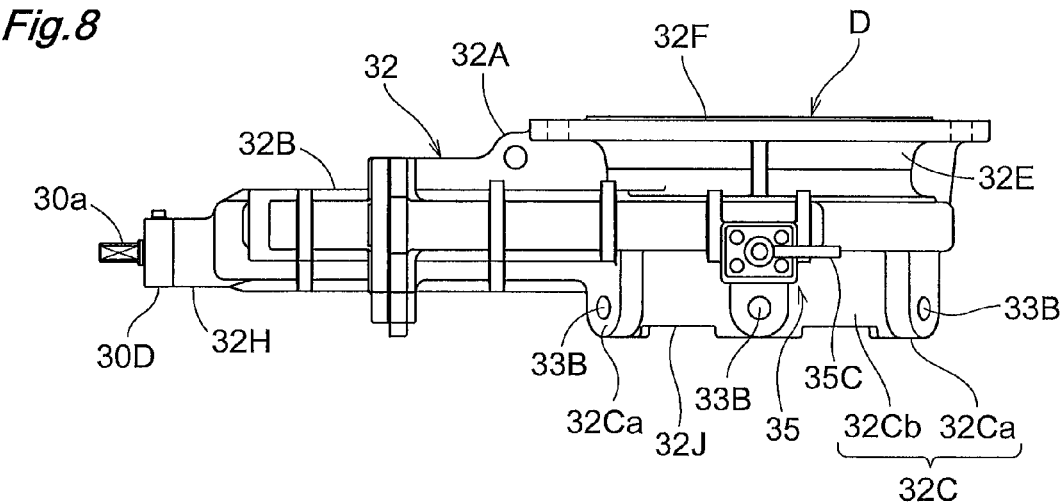
FIG. 8 is a left side view of the sluice valve for operations of an instance when the flow channel pressure adjustment means has been removed.
Figure 9:
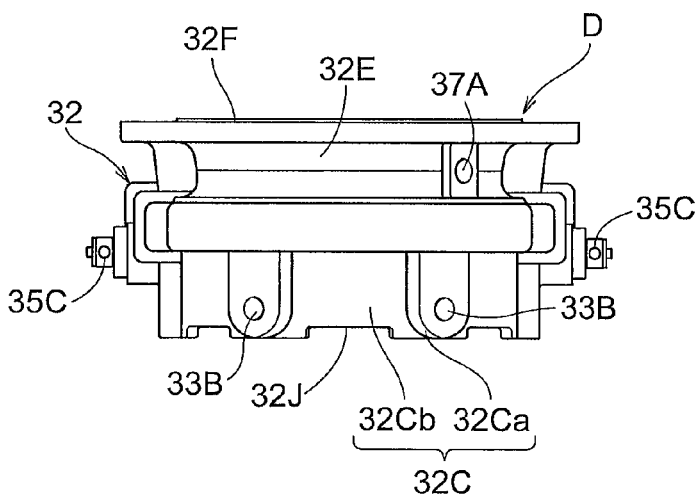
FIG. 9 is a front view of the sluice valve for operations of an instance when the flow channel pressure adjustment means has been removed.
Figure 10:
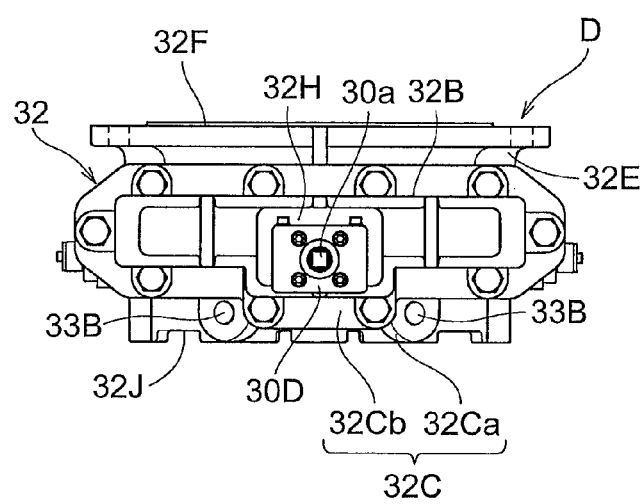
FIG. 10 is a rear view of the sluice valve for operations of an instance when the flow channel pressure adjustment means has been removed.
Figure 11:
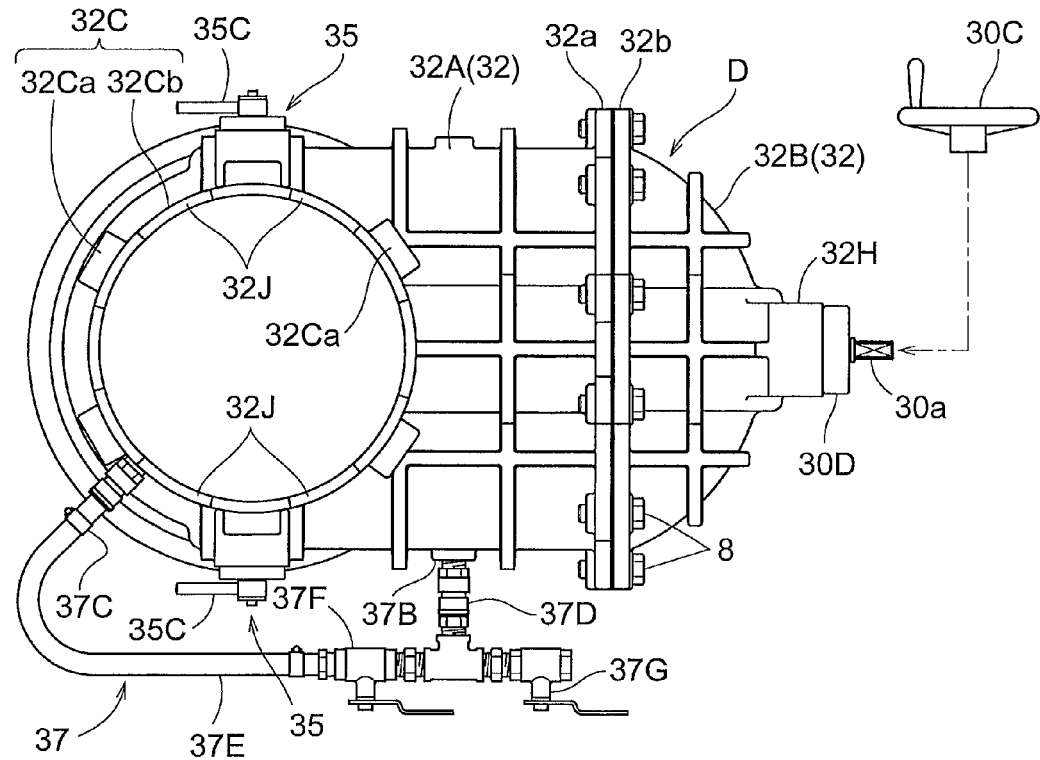
FIG. 11 is a bottom view of the sluice valve for operations.

As shown in FIGS. 3 to 5, the split T-shaped pipe 17 is composed of semi-cylindrical divided joint bodies 17A, 17B that have been bisected in the pipe circumferential direction so as to be capable of being externally mounted on the water supply pipe 1 from two side directions in the radial direction of the pipe. The split T-shaped pipe 17 has coupling flanges 17a, 17b for detachably securing and coupling the two divided joint bodies 17A, 17B, which are externally mounted on the water supply pipe 1, via a plurality of bolts 8 and nuts 9 as an example of the fastening means, the coupling flanges 17a, 17b being integrally formed at the two end parts of the divided joint bodies 17A, 17B in the pipe circumferential direction; and a branching pipe (an example of a connecting pipe) 17C for providing communication in the radial direction of the pipe with the through-hole 16 formed in the pipe wall of the water supply pipe 1, the branching pipe 17C being projectingly formed in an integral fashion in the center part in the pipe circumferential direction and in the center part in the pipe axial center direction of the upper divided joint body 17A, which is externally mounted on the upper half of the water supply pipe 1.

Securing bolts 20 that are threadably operated in a state biting into the external peripheral surface of the water supply pipe 1 from the exterior in the radial direction of the pipe are provided in a plurality of locations in the circumferential direction of the two ends of the two divided joint bodies 17A, 17B in the pipe axial center direction, and this plurality of securing bolts 20 are fastenably operated, whereby the split T-shaped pipe 17 is firmly secured in a predetermined orientation to the water supply pipe 1 and a rubber packing 21 for maintaining a watertight state between the external peripheral surface of the water supply pipe 1 is mounted in a seal-holding groove formed in the internal peripheral surface of the two divided joint bodies 17A, 17B.

When attachment of the split T-shaped pipe 17 has been completed, a flange cover (not shown) for sealing the upper opening of the branching pipe 17C in a watertight state is attached to a coupling flange 17D on the upper end of the branching pipe 17C, and water is injected into the internal space between the internal peripheral surface of the split T-shaped pipe 17 and the external peripheral surface of the water supply pipe 1 at a pressure that corresponds to water supply pressure to perform a water pressure test and check for the presence of a leak.

When this water pressure test is passed, a super-hardening cement (jet cement) 23, which is an example of a reinforcement filling material, is filled into the internal space between the internal peripheral surface of the split T-shaped pipe 17 and the external peripheral surface of the water supply pipe 1 in a state excluding the formation area of the through-hole 16, and the pipe wall of the water supply pipe 1 in which the through-hole 16 is formed is reinforced, as shown in FIG. 3.

As shown in FIGS. 2 and 4, the installation base 15 can be stably grounded on the operations bottom surface of the work pit P, and is formed of a steel material provided with rigidity that can stop relative approaching movement in the pipe axial center direction of the two remaining pipe sections 1A, 1B of the water supply pipe 1 during separation and removal of the to-be-renovated pipeline assembly A. One example of the installation base 15 is composed of two H-shaped steel sections (e.g., 200 (H dimension)×200 (B dimension)) that can be juxtaposed along the pipe axial center direction on the lower side of the location corresponding to the renovation operations area W of the water supply pipe 1.

The two H-shaped steel sections are configured with a length that is greater than the entire length L of the to-be-renovated pipeline assembly A by an amount equal to the space for attaching the two pipe holders 18; a lower-side web 15A of the two H-shaped steel sections is configured as the grounded plate part and an upper-side web 15B is configured as the attachment plate part for the pipe holders 18 and the pipe supporter 19.

The pipe holders 18 are composed of a pipe-bearing member 18A provided with a semi-arcuate pipe-bearing part 18a for bearing and supporting the lower half part of the external peripheral surface of the water supply pipe 1; a pipe-pressing member 18B provided with a semi-arcuate pipe-pressing part 18b capable of pressing and securing the upper half part of the external peripheral surface of the water supply pipe 1; and an attachment base 18C for securing and coupling the pipe-bearing member 18A to the upper-side web 15B of the two H-shaped steel sections, as shown in FIG. 3.

Coupling flanges 18d, 18e for detachably holding and securing the pipe-bearing part 18a and the pipe-pressing part 18b to the external peripheral surface of the water supply pipe 1 via a plurality of bolts 8 and nuts 9 as an example of the fastening means are integrally formed on the two ends of the pipe-bearing part 18a of the pipe-bearing member 18A in the pipe circumferential direction and on the two ends of the pipe-pressing part 18b of the pipe-pressing member 18B in the pipe circumferential direction. Securing bolts 22 that are threadably operated in a state biting into the external peripheral surface of the water supply pipe 1 from the exterior in the radial direction of the pipe are provided in a plurality of locations in the pipe circumferential direction of the pipe-bearing part 18a and in a plurality of locations in the pipe circumferential direction of the pipe-pressing member 18B, and the plurality of securing bolts 22 is fastenably operated, whereby the pipe holder 18 is firmly secured to the water supply pipe 1 in a predetermined orientation.

A coupling flange 18g is formed on the upper end of the attachment base 18C, and is secured and coupled to a coupling flange 18f on the lower end of the pipe-bearing member 18A via a plurality of bolts 8 and nuts 9 as an example of the fastening means. A coupling flange 18h is formed on the lower end of the attachment base 18C, and is secured and coupled to the upper-side web 15B of the two H-shaped steel sections 15 via a plurality of bolts 8 and nuts 9 as an example of the fastening means.

The lower side coupling flange 18h of the attachment base 18C is attached across the upper-side web 15B of the two H-shape steel sections, and therefore doubles as a coupling member for securing and coupling the two H-shaped steel sections together.

The pipe holder 18 is firmly secured to the water supply pipe 1 in a state in which the coupling flange 18d of the pipe-bearing member 18A and the coupling flange 18e of the pipe-pressing member 18B are in contact with (or adjacent to) one end of the two divided joint bodies 17A, 17B of the split T-shaped pipe 17 in the pipe axial center direction, as shown in FIG. 3.

For this reason, the two split T-shaped pipes 17 firmly secured to the water supply pipe 1 are dually configured as a pipe-securing members that are secured in the two locations at the two ends of the renovation operations area of the water supply pipe 1; and the two pipe holders 18 firmly secured to the water supply pipe 1 are in contact from the pipe axial center direction with the two split T-shaped pipe 17 dually configured as a pipe-securing member, and are dually configured as movement stoppers that can stop relative approaching movement of the two remaining pipe parts 1A, 1B of the water supply pipe 1 in the pipe axial center direction when the to-be-renovated pipeline assembly A is separated and removed.

The pipe supporter 19 is composed of a pipe-bearing member 19A provided with a semi-arcuate pipe-bearing part 19a for bearing and supporting the lower half part of the external peripheral surface of the connecting pipe 4, which is a constituent member of the to-be-renovated pipeline assembly A; a substantially U-shaped tap bolt 19B that is mounted from above on the upper half part of the external peripheral surface of the connecting pipe 4; and an attachment base 19C for securing and coupling the pipe-bearing member 19A to the upper-side web 15B of the two H-shaped steel sections, as shown in FIG. 2.

A fastening nut 24 and a lock nut 25 are threaded onto the two screw shaft parts of the tap bolt 19B inserted through the through-holes at the two ends of the pipe-bearing part 19*a* in the circumferential direction, and the fastening nut 24 and lock nut 25 are fastenably operated, whereby the pipe-bearing member 19A and tap bolt 19B of the pipe supporter 19 are held and secured to the connecting pipe 4.

A coupling flange 19*e* is formed on the upper end of the attachment base 19C, and is secured and coupled to a coupling flange 19*d* on the lower end of the pipe-bearing member 19A via a plurality of bolts 8 and nuts 9 as an example of the fastening means. A coupling flange 19*f* is formed on the lower end of the attachment base 19C, and is secured and coupled to the upper-side web 15B of the two H-shaped steel sections via a plurality of bolts 8 and nuts 9 as an example of the fastening means.

A pipe-securing and pipe-supporting apparatus C used in the renovation method is composed of two H-shaped steel sections that constitute the installation base 15, and the two pipe holders 18 and the pipe supporter 19.

The installation base 15 is delivered and arranged on the ground in the renovation operations location that corresponds to the renovation operations area W of the water supply pipe 1, and is used for merely securing the two pipe holders 18. Therefore, there is no need for a curing period such as for the case in which a concrete base and concrete struts are built, and the installation base 15 can be removed and delivered unaltered to the next construction site after the new pipeline assembly B has been connected to the two remaining pipe parts 1A, 1B of the removed water supply pipe 1.

(3) The operations steps of FIGS. 4 and 5 show the steps for securing and coupling a valve case 32 of the sluice valve for operations D to the coupling flange 17D on the branching pipe 17C of the split T-shaped pipe 17 in a watertight state, the sluice valve for operations D being provided with a valve element 31, which is actuated so as to open and close in the horizontal direction by the rotating operation of valve operation means 30. The details of the sluice valve for operations D are shown in FIGS. 6 to 16.

Figure 13:
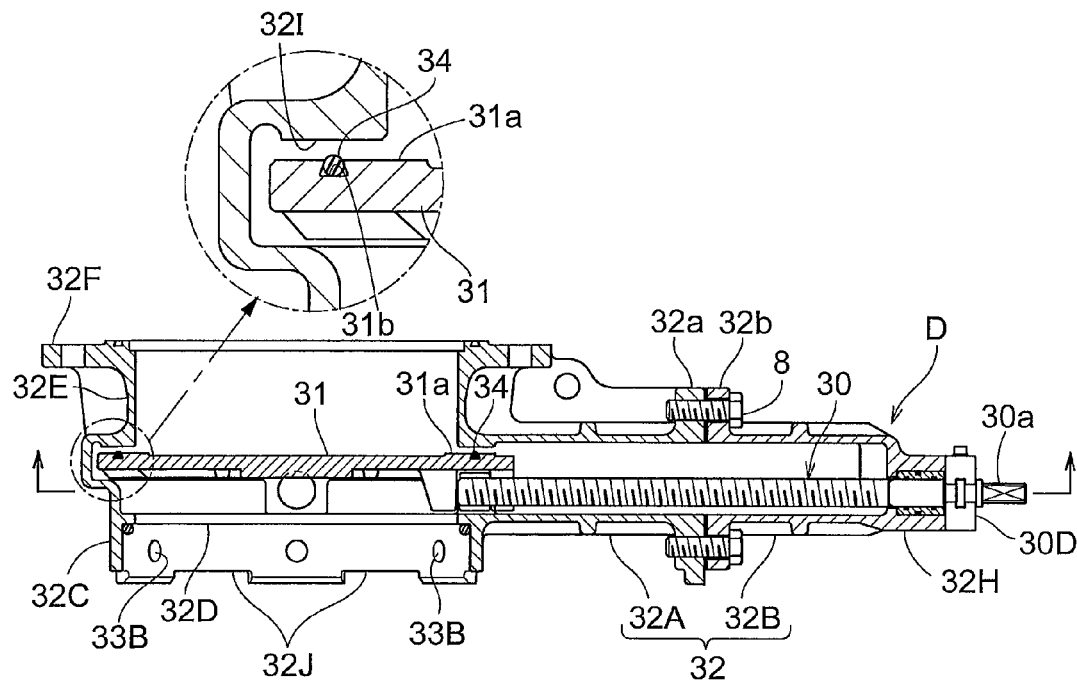
FIG. 13 is a longitudinal sectional view of the sluice valve for operations.
Figure 14:
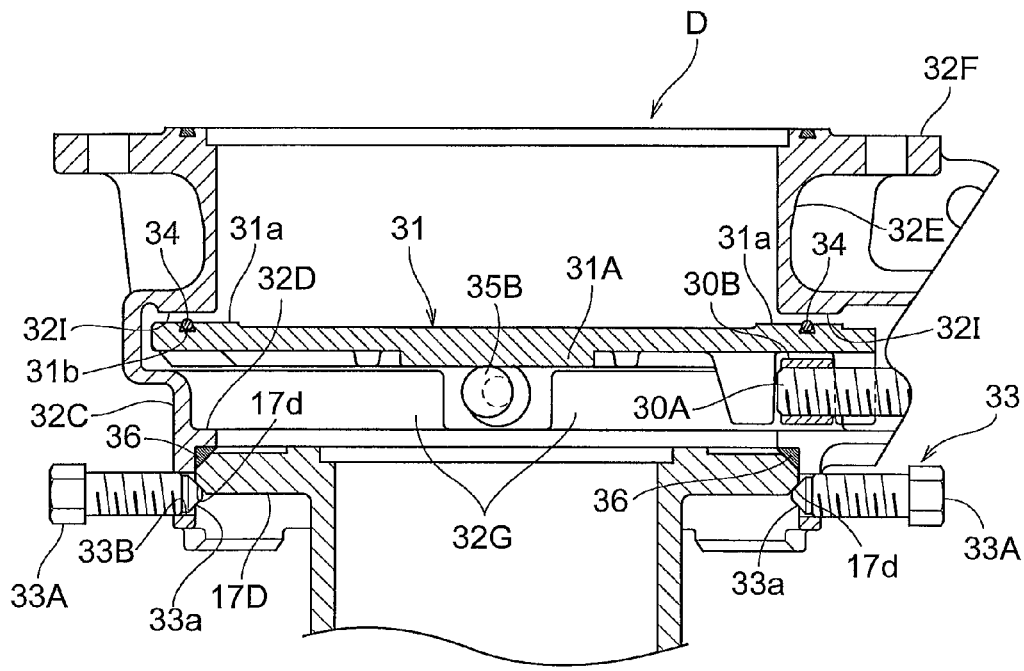
FIG. 14 is an enlarged cross-sectional view of the main parts of the split T-shaped pipe and the sluice valve for operations of an instance when the pressing means is in a non-pressing state.
Figure 15:
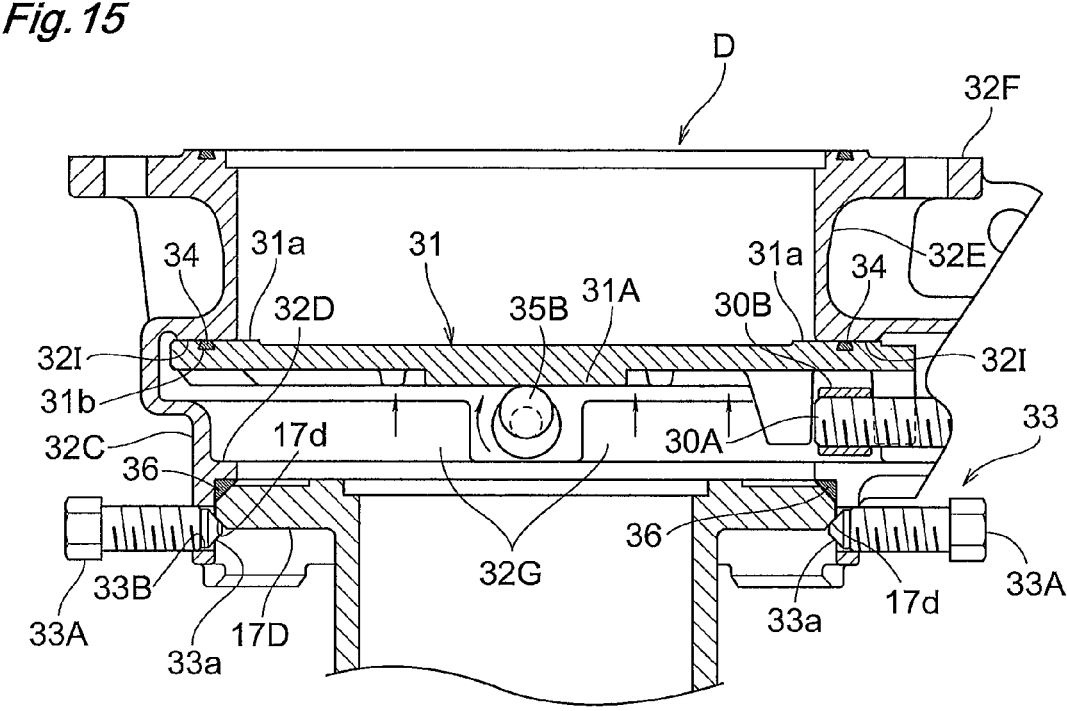
FIG. 15 is an enlarged cross-sectional view of the main parts of the split T-shaped pipe and the sluice valve for operations of an instance when the pressing means is in a pressing state.

As shown in FIGS. 13 to 15, a cylindrical lower coupling tube part 32C that can be externally fitted and mounted from above on the coupling flange 17D of the branching pipe 17C is integrally formed on the lower part of the valve case 32 of the sluice valve for operations D; and an annular working part 32D that is in contact in a riding state with a peripheral edge part of the upper surface of the coupling flange 17D of the branching pipe 17C is integrally formed on the upper part of the internal peripheral surface of the lower coupling tube part 32C and in a proximal location below the opening and closing movement pathway of the valve element 31. The lower coupling tube part 32C is provided with pulling and securing means 33 which is configured, when the annular working part 32D is resting on and supported by the coupling flange 17D of the branching pipe 17C, to pull and secure the valve case 32 to the coupling flange 17D while the pulling and securing means 33 is coupled to the lower surface (rear surface) of the coupling flange 17D.

As shown in FIGS. 12 to 15, a cylindrical upper coupling tube part 32E that forms a flow channel inside the valve concentrically through the lower coupling tube part 32C is integrally formed in the upper part of the valve case 32; and a coupling flange 32F for attaching a drill 27, a flow channel cut-off apparatus 40, or the like is integrally formed on the opening end of the upper coupling tube part 32E. A guiderail 32G for bearing in a riding state the lower surface of sliding parts 31A (which is the upstream side surface on the water supply pipe 1 side) projectingly formed on the left and right sides of the valve element 31 to slidably guide the two sliding parts 31A of the valve element 31 between a closed valve position and an open valve position is formed on the left and right inside walls that face the opening and closing movement pathway inside the valve case 32.

As shown in FIGS. 13 to 15, an annular valve seat 32I, with which an annular sealing and pressing surface 31*a* of the valve element 31 is in contact from the pipe axial center direction, is formed on the inside wall that faces the opening and closing movement pathway inside the valve case 32 in a location that faces the annular sealing and pressing surface 31*a* on the upper surface of the valve element 31 (side surface on the downstream side) in an open valve position. An O-ring 34, which is an example of the seal material that provides a watertight state with the valve seat 32I of the valve case 32, is detachably mounted in a seal holding groove 31*b* formed in the annular sealing and pressing surface 31*a* of the valve element 31. Pressing means 35 for imparting downstream pressing and moving force to the lower surface (the side surface of the upstream side) of the valve element 31 in the closed valve position to press the O-ring 34 mounted in the seal holding groove 31*b* of the valve element 31 against the valve seat 32I inside of the valve case 32 is disposed in the valve case 32.

Figure 12:
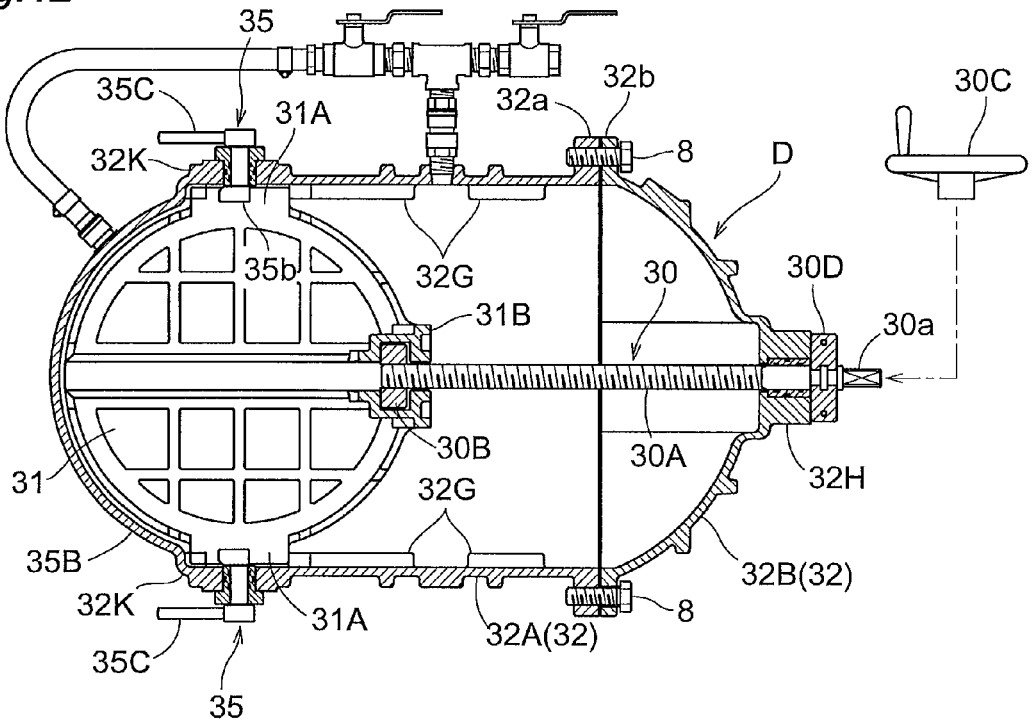
FIG. 12 is a horizontal sectional view of the sluice valve for operations.
Figure 16:
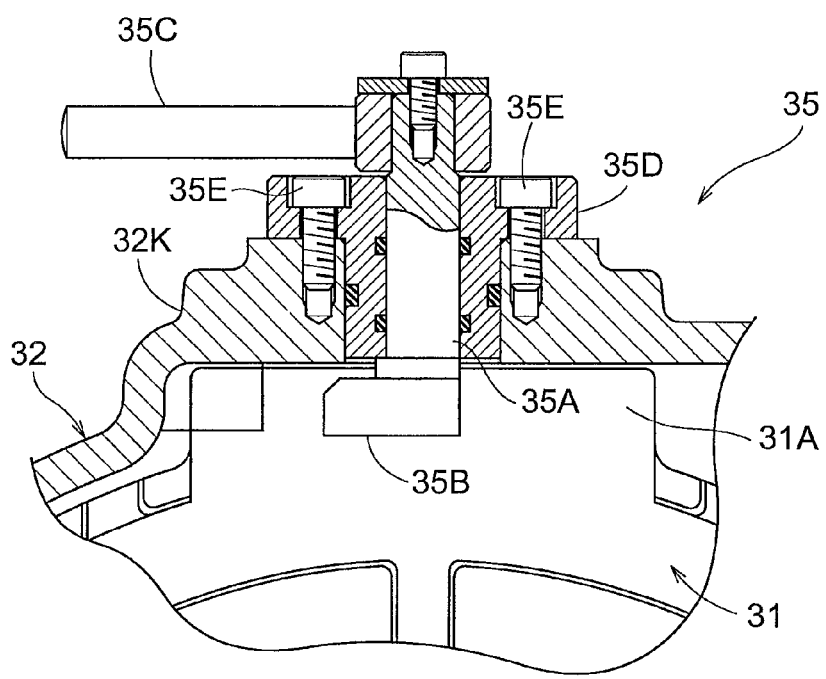
FIG. 16 is an enlarged cross-sectional view of the pressing means of the sluice valve for operations.

The pressing means 35 is configured as shown in FIGS. 12 and 16, wherein a bushing 35D for rotatably supporting an operation shaft 35A about the horizontal axial center offset slightly below the lower surface of the valve element 31, which is in a state of contact with the upper surface of the guiderail 32G, is secured by a locking screw 35E to a first bearing part 32K formed in the side wall facing the opening and closing movement pathway of the valve element 31 inside the valve case 32 on the left and right sides facing the two sliding parts 31A of the valve element 31 in a closed valve position; an eccentric cam 35B that is capable of changing between a non-pressing state and a pressing state is fixed to the operation shaft 35A that passes through and is supported by the bushing 35D and that projects inside the valve case 32, the non-pressing state being a state in which the eccentric cam 35B is set at a distance below the lower surface of the two sliding parts 31A of the valve element 31 in accompaniment with the rotation of the operation shaft 35A, and the pressing state being a state in which the eccentric cam 35B presses the lower surface of the two sliding parts 31A upward (downstream side) to the closed valve position in which the O-ring 34 mounted in the seal holding groove 31*b* of the valve element 31 is pressed against the valve seat 32I of the valve case 32; and an operation handle 35C is fixed to the shaft part projecting outside the valve case 32 the operation shaft 35A.

The valve case 32 is composed of divided valve case bodies 32A, 32B that are separably bisected in a position where the opening is formed that allows the valve element 31 to be removed to the exterior, i.e., in a position that traverses in the crosswise direction the two sliding parts 31A of the valve element 31 in the open valve position, as shown in FIGS. 6 to 15. The two coupling tube parts 32C, 32E and the guiderail 32G are provided to the first divided valve case body 32A, and the second divided valve case body 32B has a second bearing part 32H that passes through and rotatably supports one end of a valve stem 30A of the valve operation means 30.

A coupling flange 32*a* formed in the opening of the separation side of the first divided valve case body 32A and a coupling flange 32*b* formed in the opening of the separation side of the second divided valve case body 32B are detachably secured and coupled in a watertight state via bolts 8 or other fastening means. Slightly less than half of the valve element 31 in the open valve position is configured so as to be exposed to the exterior by way of the opening of the separation side of the first divided valve case body 32A in a state in which the second divided valve case body 32B has been removed, and the valve element 31 is configured so as to be capable of being removed to the exterior from the opening of the separation side of the first divided valve case body 32A.

The valve operation means 30 is provided with, as a main configuration, the valve stem 30A on which an externally-threaded screw is formed on the external peripheral surface, a screw piece 30B threaded from the other end of the valve stem 30A, and an operation handle 30C mounted in an integral rotating state on the shaft end 30*a* of the valve stem 30A that projects from the second divided valve case body 32B, as shown in FIGS. 12 to 15.

The screw piece 30B is accommodated in a state that allows upward movement (downstream side) inside an accommodation concavity 31B of the upper opening formed in the base part of the valve element 31 that corresponds to the bearing part 32H of the second divided valve case body 32B, and is accommodated in a state that stops co-rotation when the valve stem 30A is rotatably operated. A stopper member 30D is attached to the bearing part 32H of the second divided valve case body 32B, the stopper member 30D being used for stopping yet rotatably supporting the shaft portion contiguous to the shaft end 30*a* for mounting the handle of the valve stem 30A.

As shown in FIGS. 14 and 15, a bolt 33A is provided with a tapered pressing surface 33*a* that makes contact from the horizontal direction with a tapered surface 17*d* formed on the external peripheral edge part of the lower surface of the coupling flange 17D, and the pulling and securing means 33 threads the bolt 33A into a screw hole 33B formed in an area where the rotatably operated shaft is positioned on the horizontal plane that passes through the lower surface (rear surface) of the coupling flange 17D in a plurality of locations (six locations in this embodiment) in the circumferential direction of the lower coupling tube part 32C of the valve case 32 and in a state in which the annular working part 32D rides on and is supported by the coupling flange 17D. An O-ring 36, which is an example of the seal material, is mounted on the inside corner location formed by the internal peripheral surface of the lower coupling tube part 32C and the lower surface of the annular working part 32D, and the annular working part 32D of the valve case 32 is firmly held and secured while being pulled to the upper surface side of the coupling flange 17D of the branching pipe 17C in accompaniment with the fastening operation of the bolt 33A, and while the O-ring 36 is compressed to a watertight state.

Figure 27:
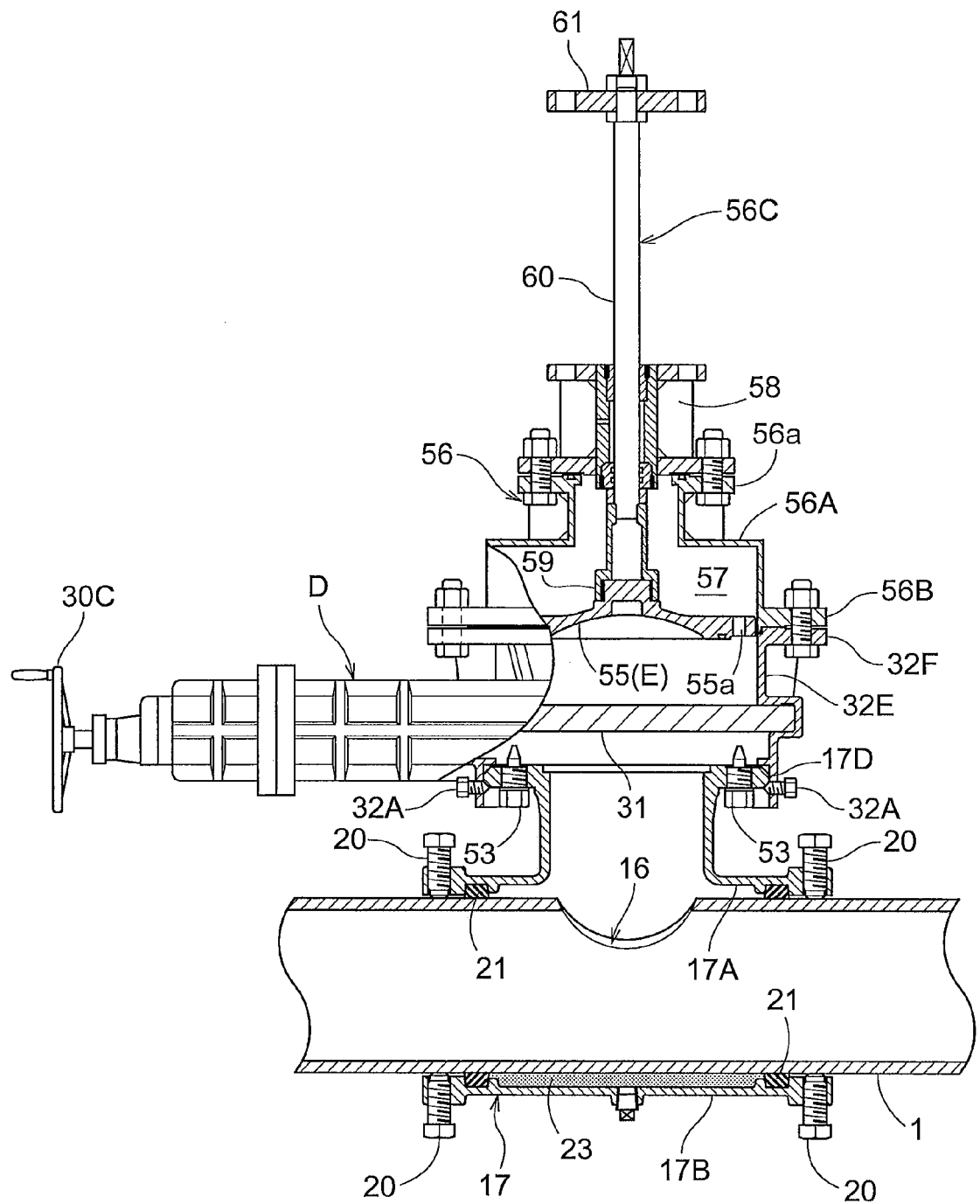
FIG. 27 is an enlarged, partially cut-away side view of the split T-shaped pipe, the sluice valve for operations, and the cover-mounting machine.
Figure 28:
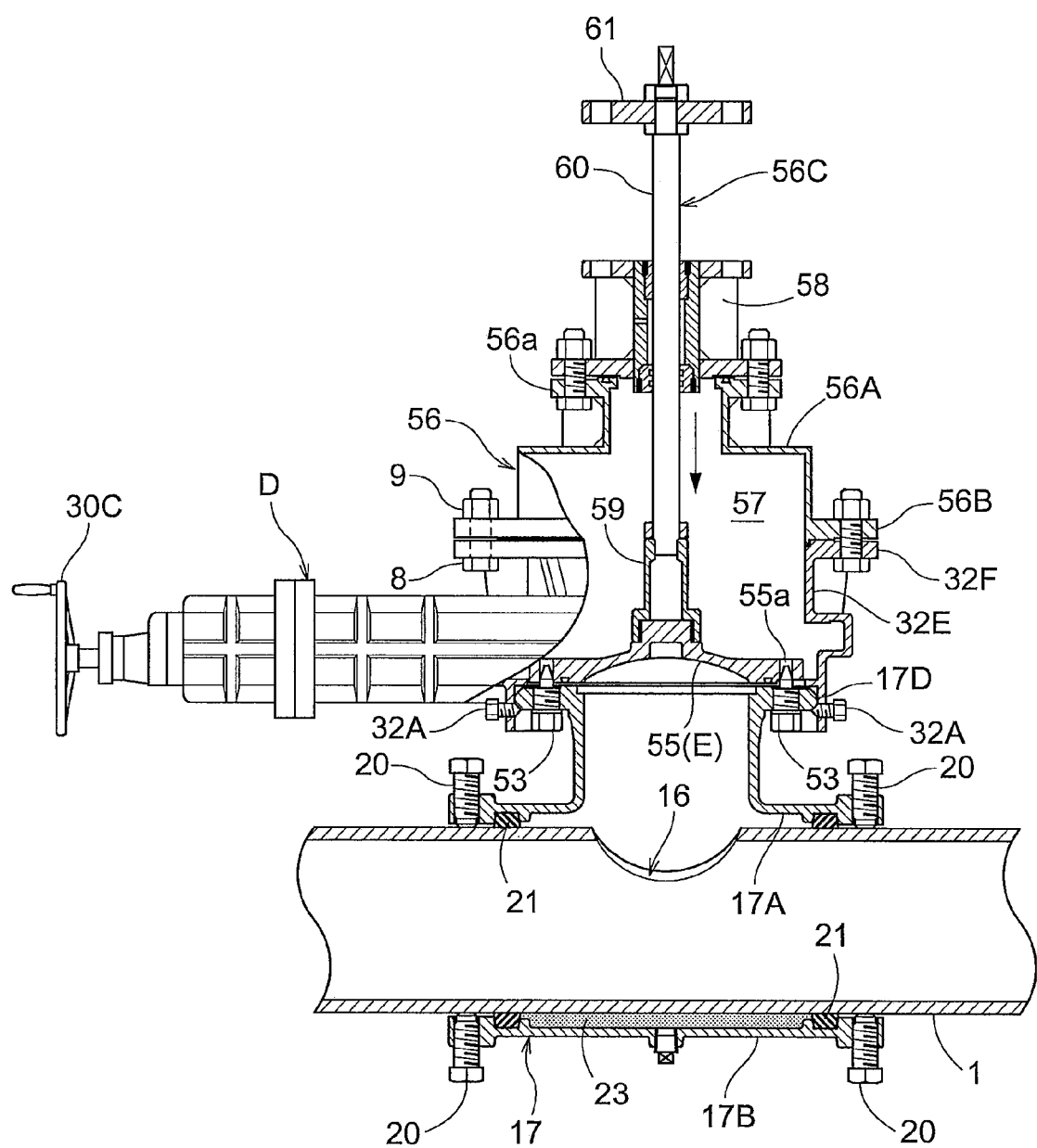
FIG. 28 is an enlarged, partially cut-away side view of an instance when the cover body is pressed against the coupling flange part of the sluice valve for operations.
Figure 33:
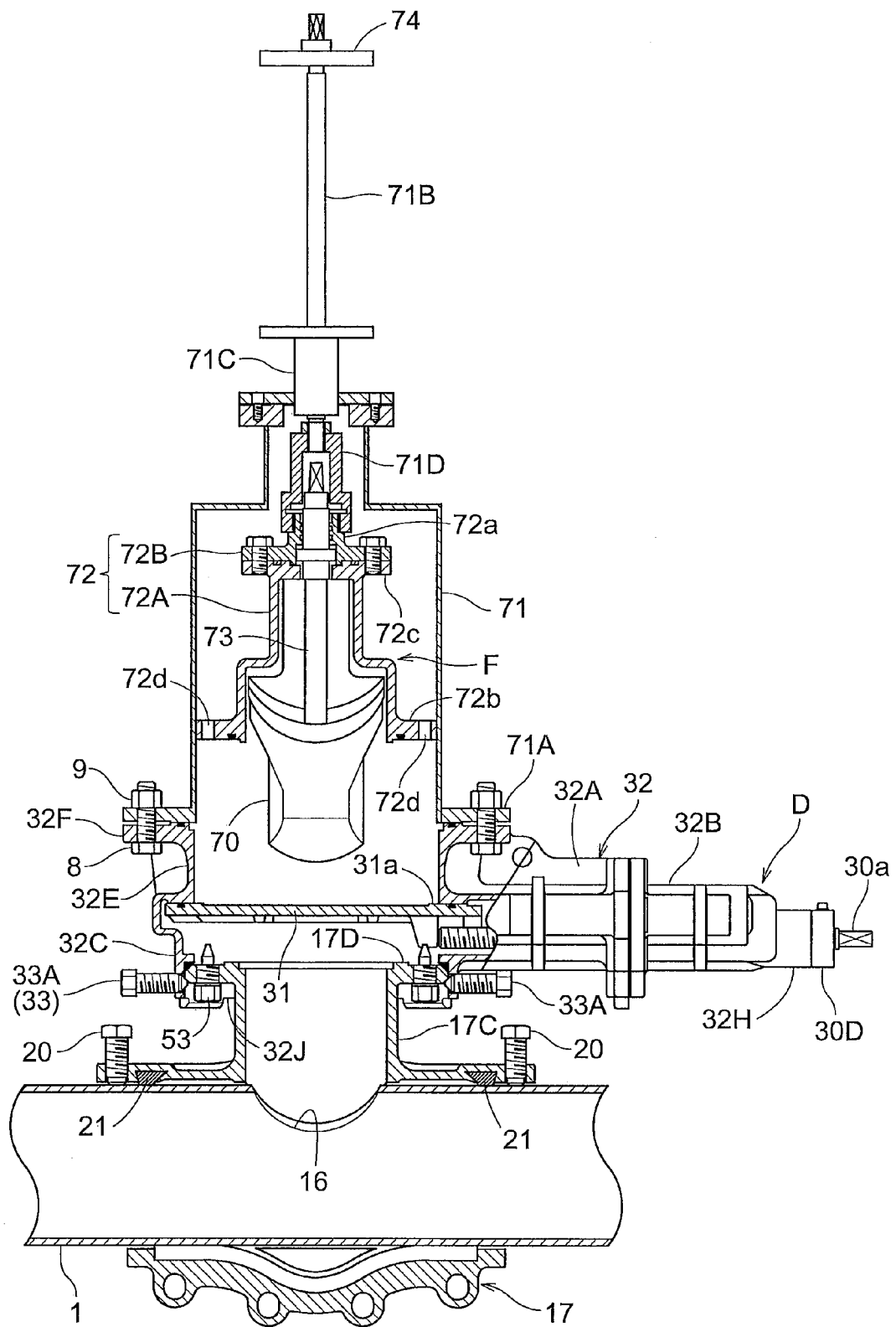
FIG. 33 is a partially cut-away side view of an instance when the operations case is attached, showing a third embodiment of the present invention.
Figure 34:
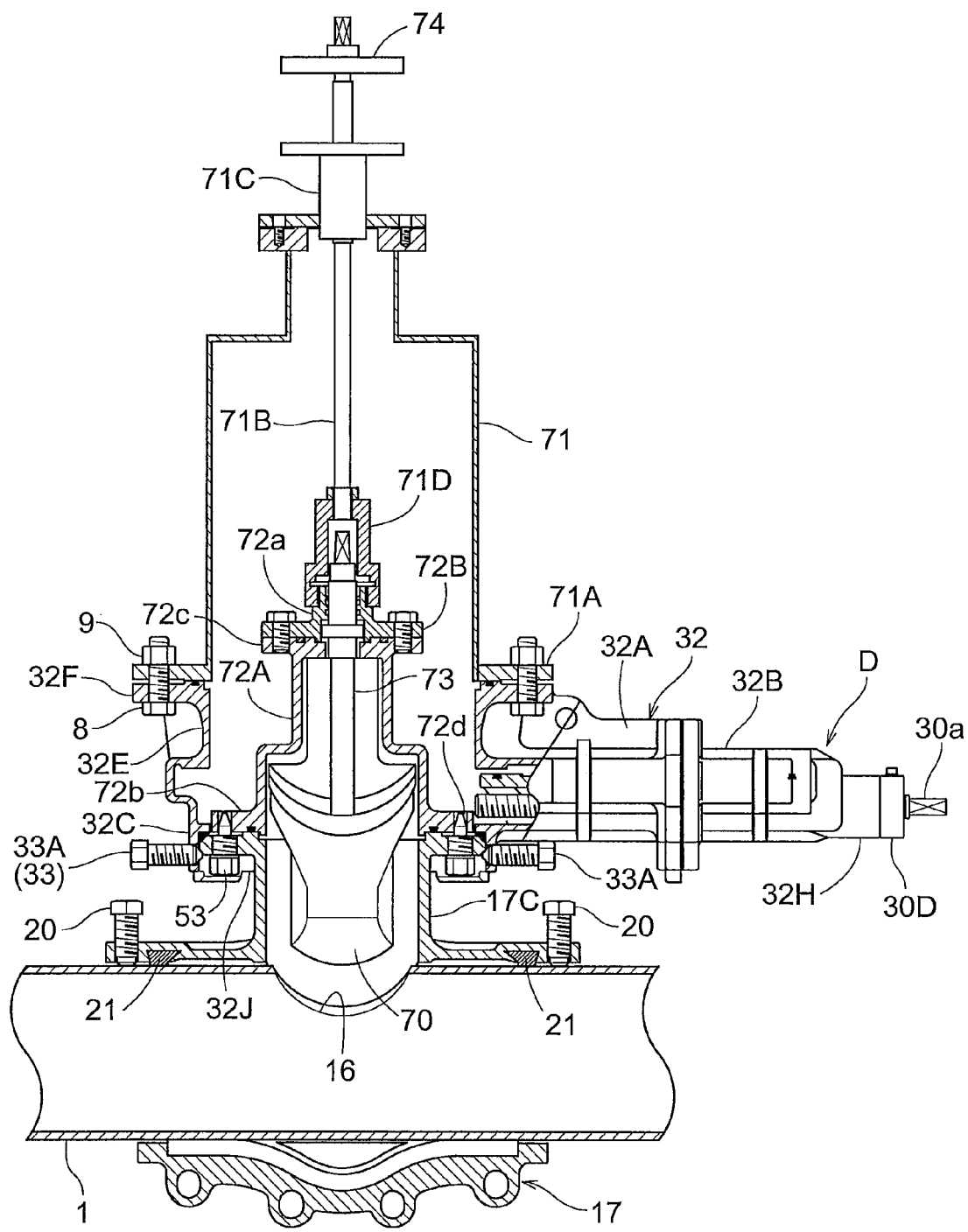
FIG. 34 is a partially cut-away side view of an instance when the valve case of the sluice valve is attached to the split T-shaped pipe.
Figure 35:
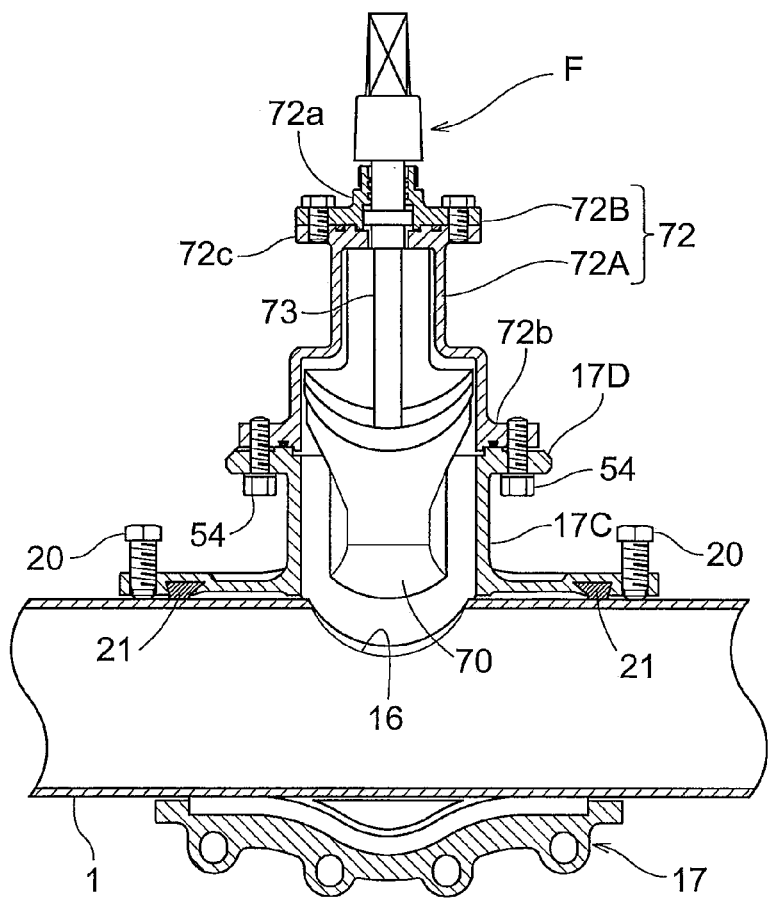
FIG. 35 is a partially cut-away side view of an instance when the valve case of the sluice valve has been secured to the split T-shaped pipe.
Figure 36:
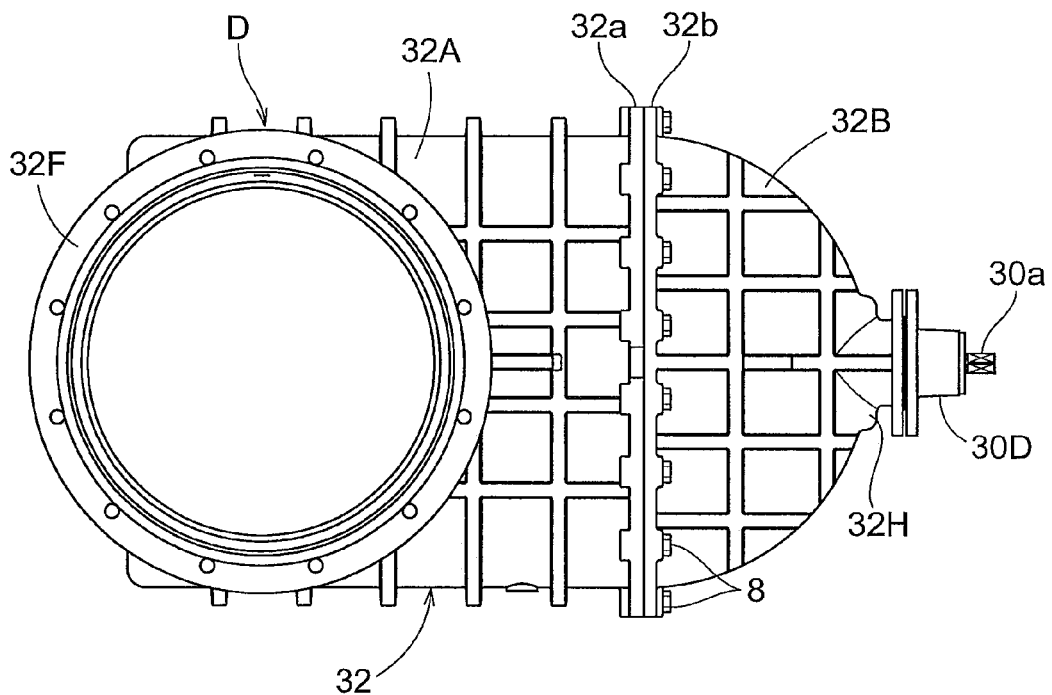
FIG. 36 is a plan view of the sluice valve for operations showing a fourth embodiment of the present invention.
Figure 37:
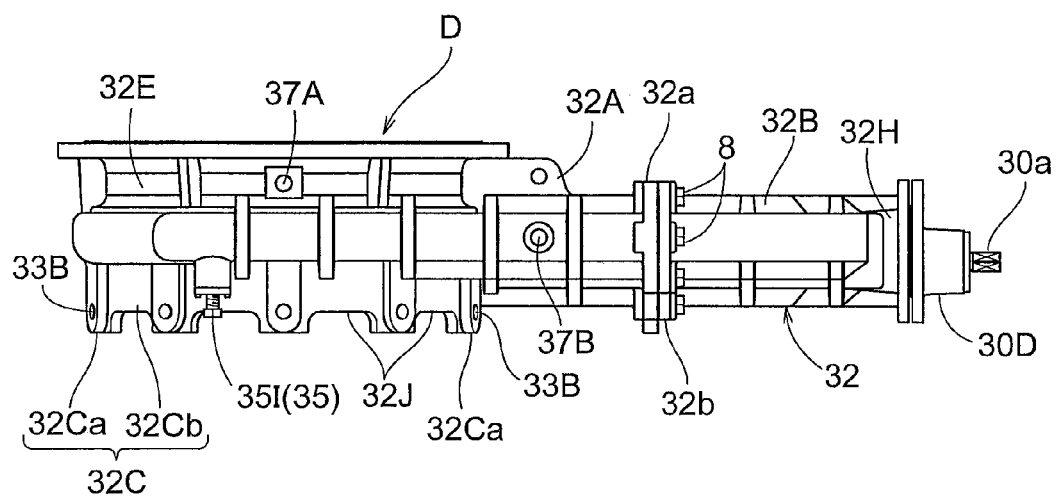
FIG. 37 is a right side view of the sluice valve for operations.
Figure 38:
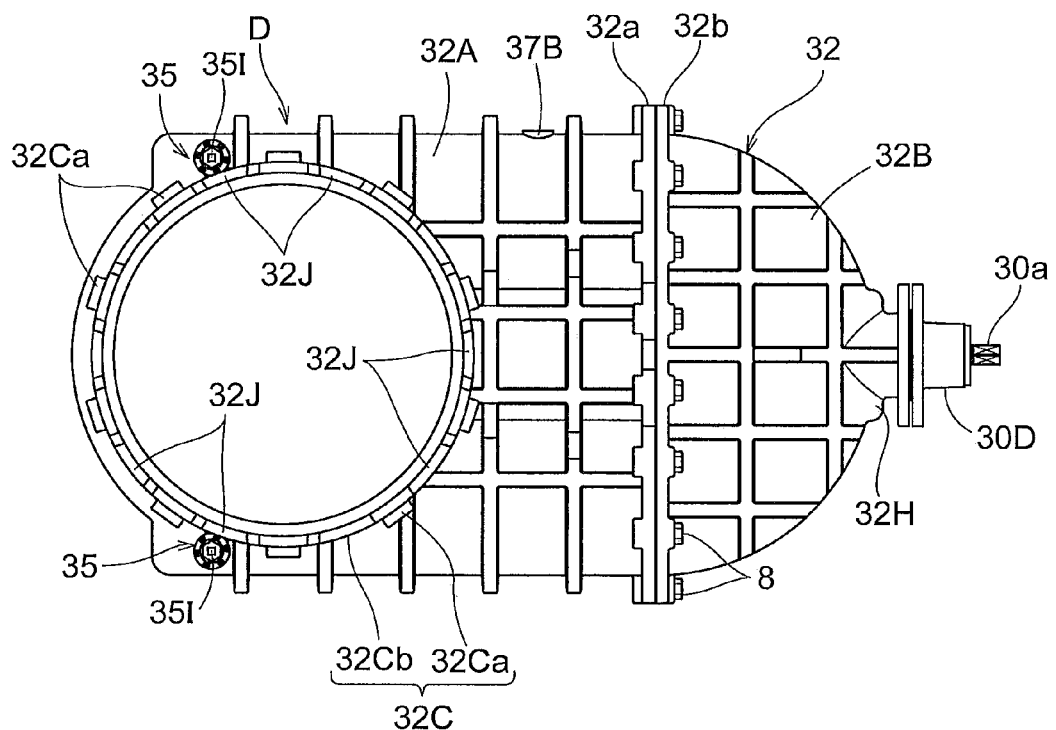
FIG. 38 is a bottom view of the sluice valve for operations.
Figure 39:
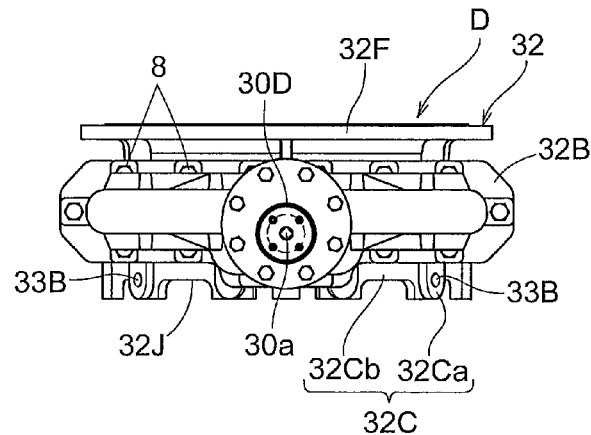
FIG. 39 is a rear view of the sluice valve for operations.
Figure 40:
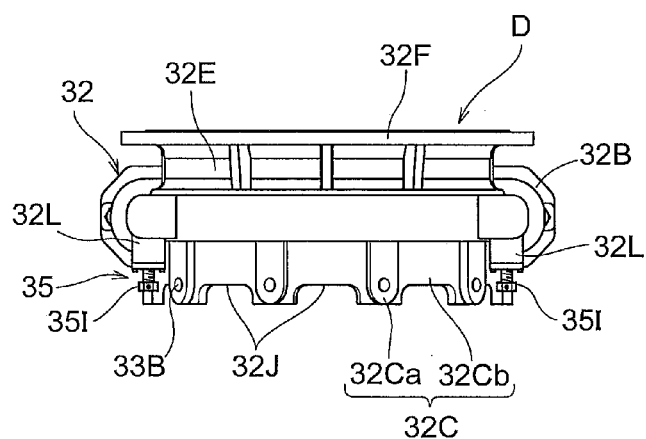
FIG. 40 is a front view of the sluice valve for operations.
Figure 41:
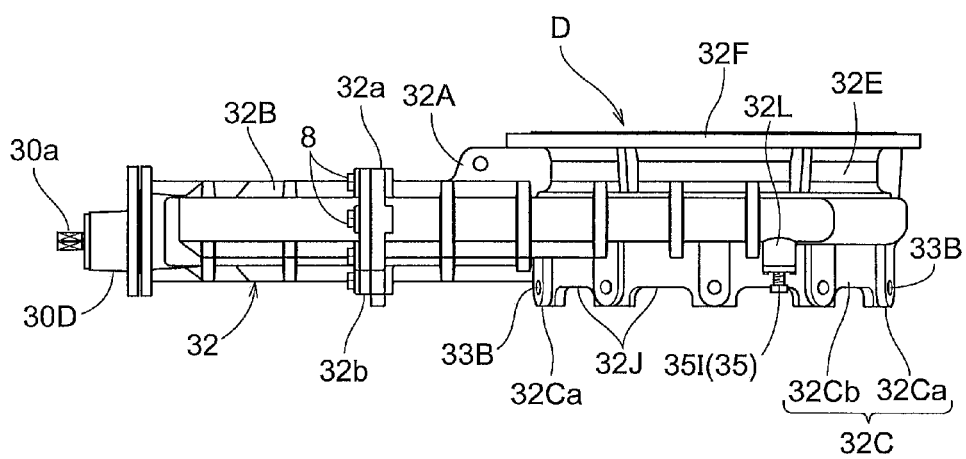
FIG. 41 is a left side view of the sluice valve for operations.

An operation recess 32J in a shape of a cutout is formed between adjacent screw holes 33B of the pulling and securing means 33 in the lower coupling tube part 32C of the valve case 32, the operation recess 32J being used for operating a securing bolt 54 from the lower surface (rear surface) of the coupling flange 17D, the securing bolt 54 being an example of the fastener for securing and coupling the coupling flange 17D of the branching pipe 17C and the fluid device E (e.g., a cover body 55 capable of sealing the opening of the branching pipe 17C of the split T-shaped pipe 17 in a watertight state, as shown in FIGS. 27 and 28; or a valve case 72 of the sluice valve F, as shown in FIGS. 33 to 35) joined through the flow channel inside the valve case 32.

Figure 29:
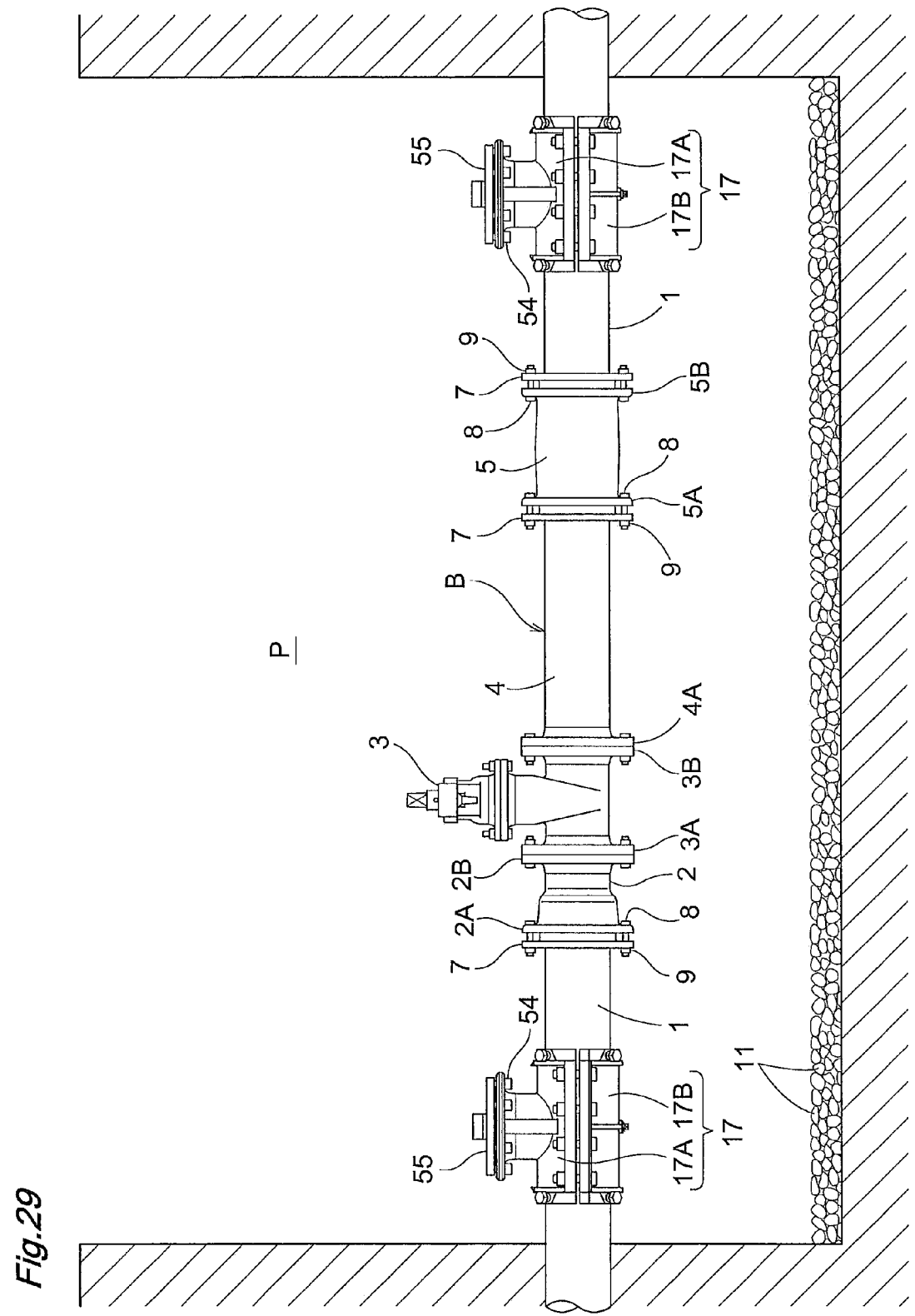
FIG. 29 is an overall side view of an instance when the cover-mounting machine, the sluice valve for operations, and the pipe-securing and pipe-supporting apparatus have been removed.

A positioning bolt 53 that engages a screw hole 55*a* formed in the cover body 55 is disposed in the coupling flange 17D of the branching pipe 17C when the cover body 55 is lowered to a position in contact with the upper surface of the coupling flange 17D; and the coupling flange 17D and cover body 55 are secured and coupled in a watertight state by the securing bolt 54, which is used in place of the removed positioning bolt 53, when the mounting position of the cover body 55 on the coupling flange 17D has been determined, as shown in FIG. 29. At this point, the operation for removing the positioning bolt 53 and the operation for securing the securing bolt 54 can be carried out using one or more of the plurality of operation recesses 32J formed in the coupling flange 17D.

The lower coupling tube part 32C of the valve case 32 is externally mounted on the coupling flange 17D of the branching pipe 17C from the pipe axial center direction, whereby a large flow channel through which the fluid device E can pass with a size that corresponds to the coupling flange 17D of the branching pipe 17C can be ensured inside the valve case 32. The structure of the pulling and securing means 33 can be simplified because the lower coupling tube part 32C of the valve case 32 can be dually configured as a pulling member when the valve case 32 is pulled and secured to the coupling flange 17C.

Additionally, when the coupling flange 17D of the branching pipe 17C and the fluid device E joined through the flow channel inside the valve case 32 are secured and coupled by the securing bolt 54, which is mounted and operated from the lower end opening side of the lower coupling tube part 32C of the valve case 32, in a state in which the valve case 32 is pulled and secured to the coupling flange 17C by the pulling and securing means 33 disposed in the lower coupling tube part 32C of the valve case 32, the securing bolt 54 can be readily fastened and operated in a simple orientation from the external side in the radial direction of the lower coupling tube part 32C by way of the cutout-shaped operation recess 32J formed in the lower coupling tube part 32C, even when the opening end edge of the lower coupling tube part 32C of the valve case 32 projects considerably further downward along the pipe axial center direction than the lower surface (rear surface) of the coupling flange 17D.

In the lower coupling tube part 32C of the valve case 32, the thickness of a first peripheral wall portion 32C*a*, which includes the location in which the plurality of screw holes 33B are formed and which is formed in the shape of a strip or substantially in the shape of a strip along the vertical direction (the pipe axial center direction), is configured to be greater than the thickness of a second peripheral wall portion 32C*b*, which includes the location in which the operation recess 32J is formed and which is formed in the shape of a strip or substantially in the shape of a strip along the vertical direction. The inside surface of the first peripheral wall portion 32C*a* of the lower coupling tube part 32C and the inside surface of the second peripheral wall portion 32C*b* are formed as the internal peripheral surface having the same inside diameter; and the length in the circumferential direction of the second peripheral wall portion 32C*b* positioned between adjacent first peripheral wall portions 32C*a* is configured to be greater than the length of the operation recess 32J in the circumferential direction.

For this reason, the first peripheral wall portion 32C*a* of the lower coupling tube part 32C in which the screw holes 33B are formed is made thicker by the strip-form shape or substantially strip-form shape along the vertical direction, and even though the area for pulling and securing the valve case 32 to the coupling flange 17C is robustly configured, the outside surface of the second peripheral wall portion 32C*b* is positioned further inward in the radial direction of the pipe than the outside surface of the first peripheral wall portion 32C*a*, and the length of the second peripheral wall portion 32Cb in the circumferential direction is configured to be greater than the length of the operation recess 32J in the circumferential direction. Therefore, the operation for fastening the securing bolt 54 through the operation recess 32J can be readily carried out without interference from the thick first peripheral wall portion 32Ca.

In this embodiment, the cutout depth of the operation recess 32J is set to a depth in which a part of the head of the positioning bolt 53 and a part of the head of the securing bolt 54 can be seen from the outside through the operation recess 32J in the radial direction of the pipe, but the cutout depth of the operation recess 32J may be configured to a depth in which the entire head of the positioning bolt 53 and the head of the securing bolt 54 can be seen.

Furthermore, flow channel pressure adjustment means 37 for adjusting and equalizing the pressure of the upstream-side flow channel and the downstream-side flow channel of the valve element 31 is disposed in the sluice valve for operations D when the valve element 31 in the closed valve position is openably operated, as shown in FIGS. 6, 7, 11, 12.

The flow channel pressure adjustment means 37 is configured having a first connection port 37A formed in the upper coupling tube part 32E of the valve case 32, the first connection port 37A being in communication with the downstream-side flow channel of the valve element 31 in the closed valve position; a second connection port 37B formed in one sidewall facing the opening and closing movement pathway inside the valve case 32, the second connection port 37B being in communication with the upstream-side flow channel of the valve element 31 in the closed valve position; and a first on-off valve 37F for opening and closing the flow channel between the two connection fittings 37C, 37D and a second on-off valve 37G for discharging clean water inside the flow channel to the exterior are disposed in a pressure equalization hose 37E, which is provided with the first connection fitting 37C which connect to the first connection port 37A in a watertight state, and the second connection fitting 37D which can connect to the second connection port 37B in a watertight state.

Figure 17:
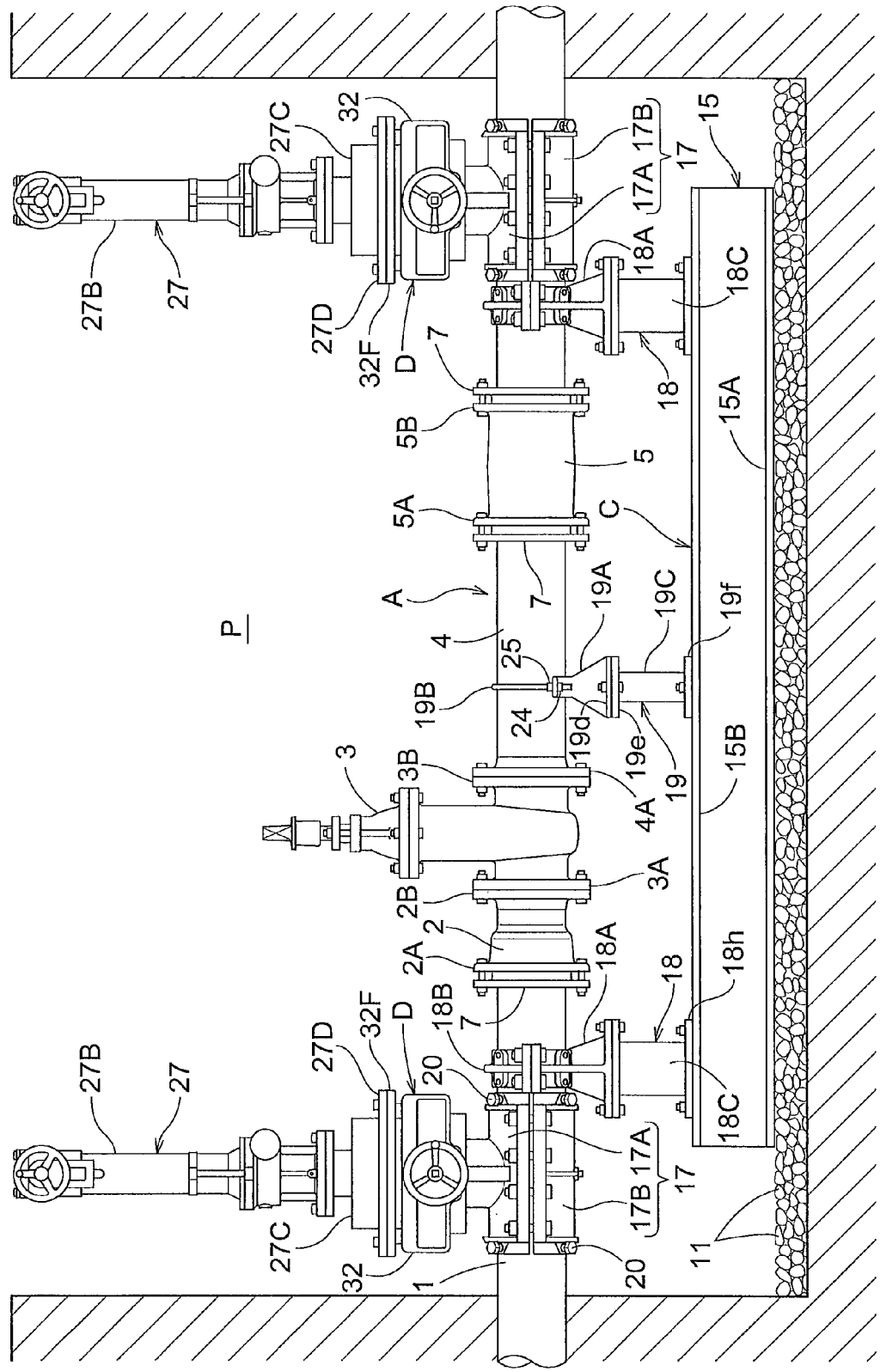
FIG. 17 is an overall side view of an instance when the drill has been attached to the two sluice valves for operations.
Figure 18:
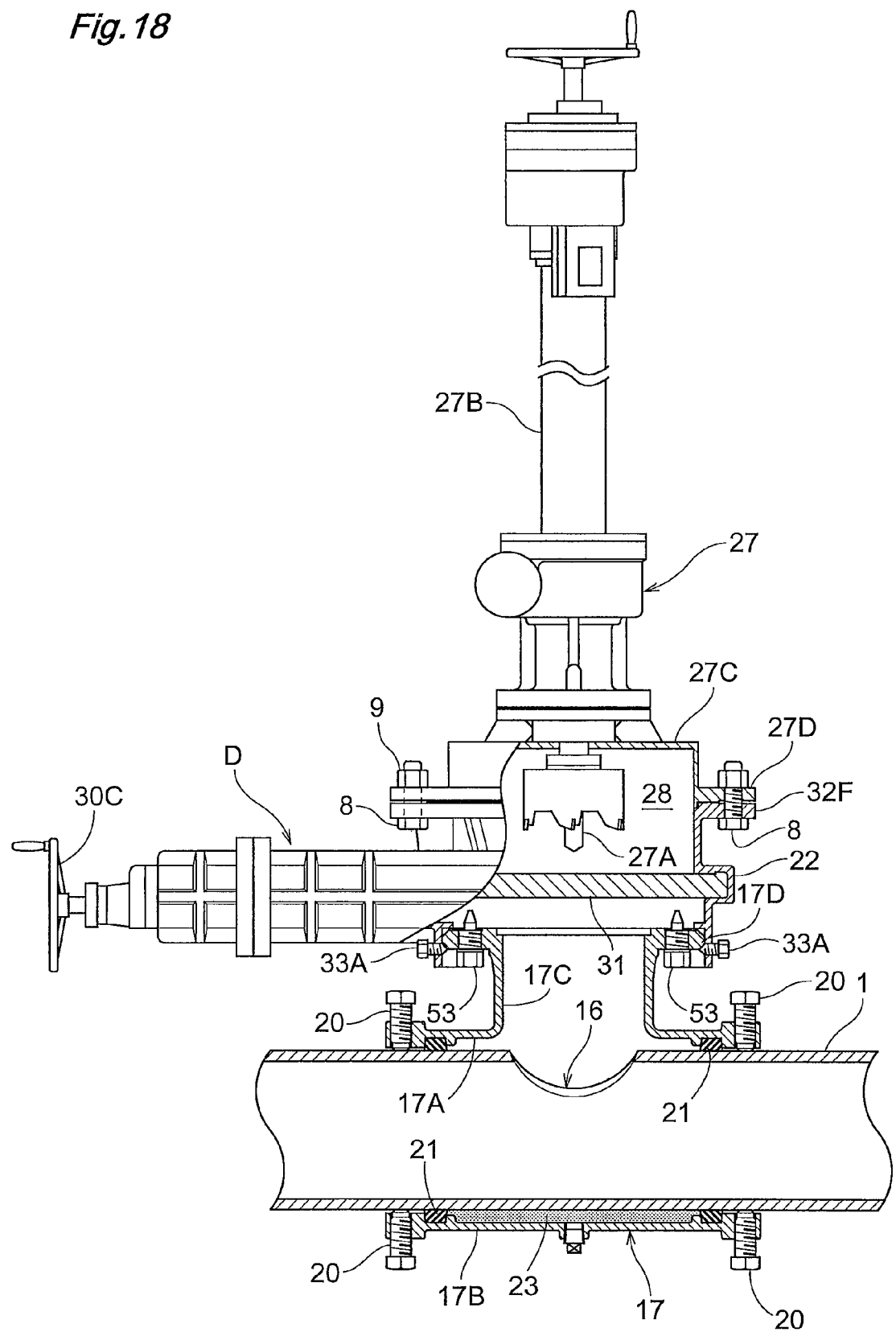
FIG. 18 is a partially cut-away side view of an instance when the drilling step has been completed.

(4) The operations steps of FIGS. 17 to 18 show a step for coupling, in a watertight state, a casing 27B of the drill 27 provided with a cylindrical rotary cutter (hole saw) 27A, which is an example of a cutting tool, to the coupling flange 32F formed on the upper part of the valve case 32 of the sluice valve for operations D; a step for sending the cylindrical rotary cutter 27A of the drill 27 through the openably operated sluice valve for operations D and the branching pipe 17C of the split T-shaped pipe 17 to form a circular through-hole 16 in the pipe wall of the water supply pipe 1; a step for withdrawing the cylindrical rotary cutter 27A into an accommodation space 28 after the through-hole 16 has been formed, and closeably operating the sluice valve for operations D; and a step for removing the drill 27 from the coupling flange 32F of the sluice valve for operations D.

A coupling case 27C capable of forming a storage space 28 for the cylindrical rotary cutter 27A is disposed in the lower part of the casing 27B of the drill 27 in the downstream-side flow channel (upper internal space) partitioned by the closeably operated valve element 31 in the valve flow channel (internal space) of the valve case 32; and a coupling flange 27D is formed in the lower part of the coupling case 27C, the coupling flange 27D being secured and coupled to the coupling flange 32F of the sluice valve for operations D in a watertight state via a plurality of bolts 8 and nuts 9, which is an example of fastening means.

Figure 19:
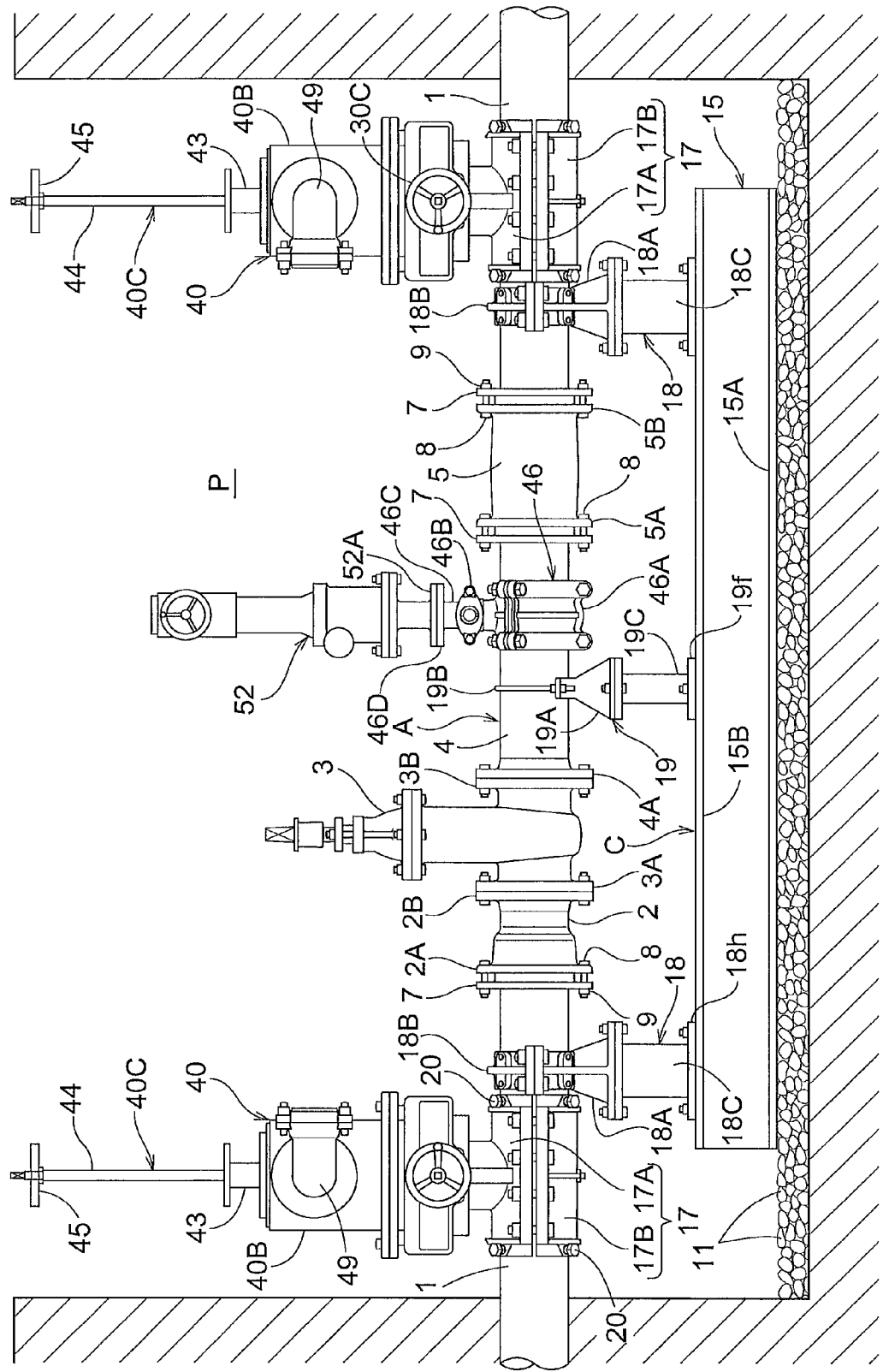
FIG. 19 is an overall side view of an instance when the flow channel cut-off apparatus has been attached to the two sluice valves for operations.
Figure 20:
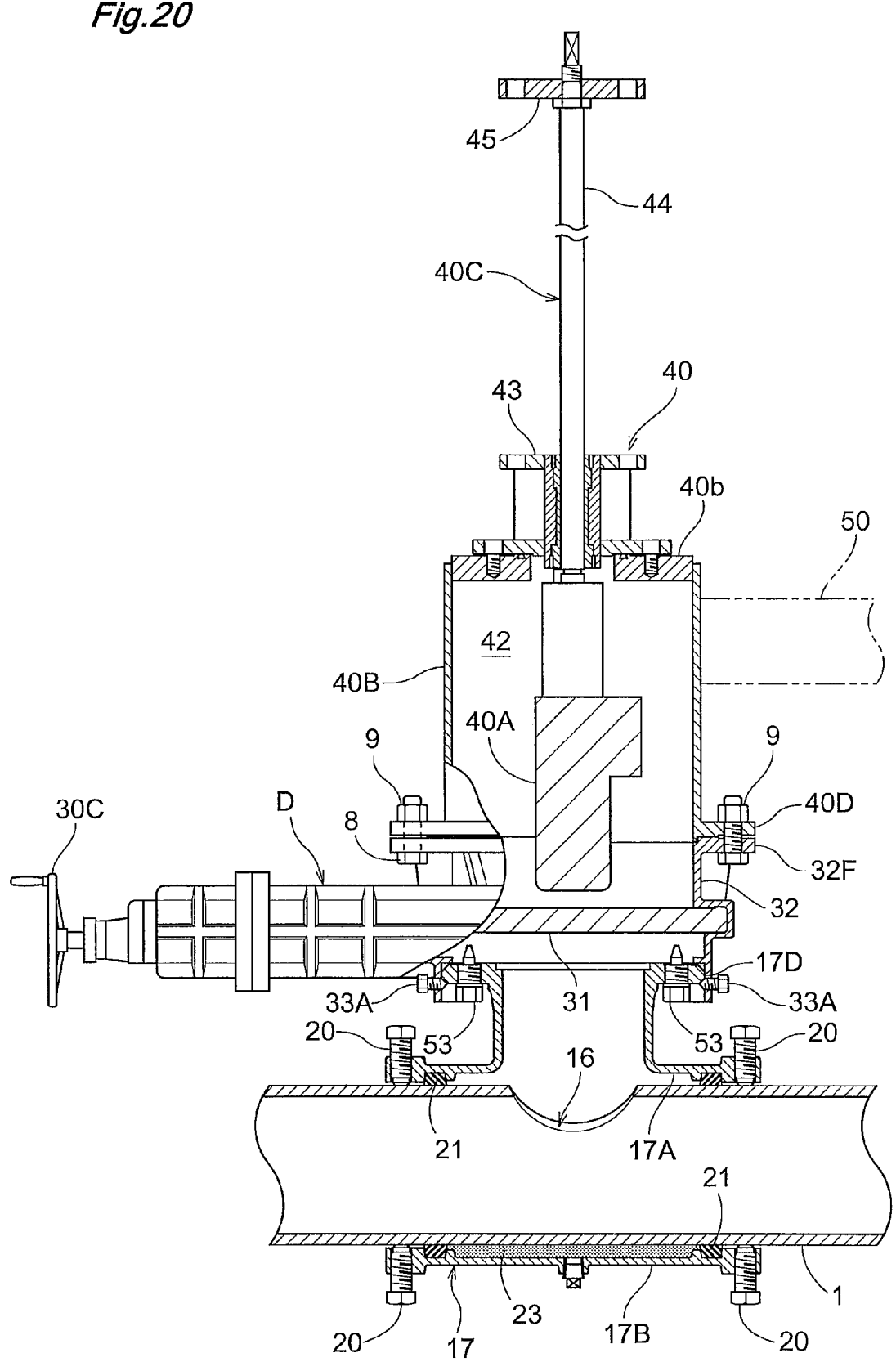
FIG. 20 is an enlarged, partially cut-away side view of the split T-shaped pipe, the sluice valve for operations, and the flow channel cut-off apparatus.
Figure 21:
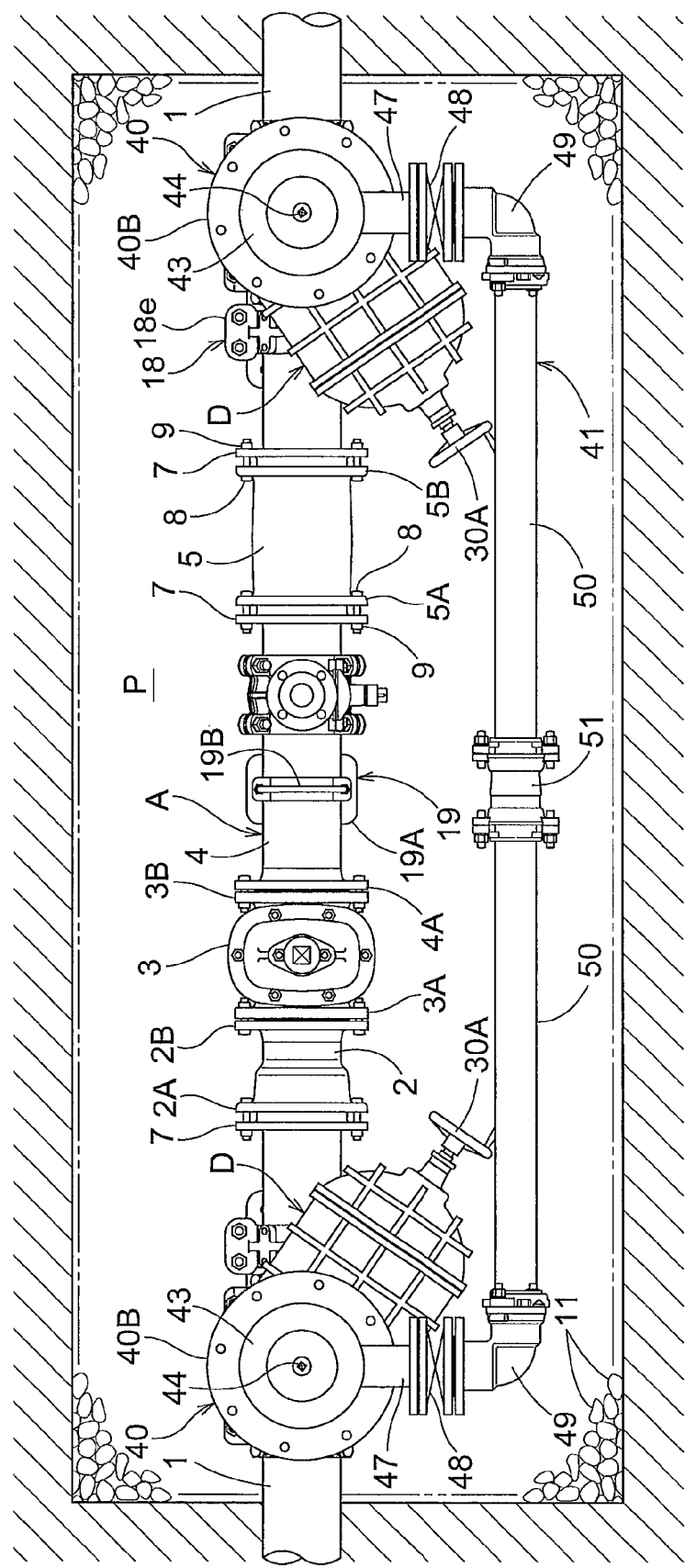
FIG. 21 is an overall plan view of an instance when the bypass piping has been connected.

(5) The operations steps of FIGS. 19 to 21 show a step for securing and coupling the flow channel cut-off apparatus 40 in a watertight state to the coupling flange 32F of the two sluice valve for operations D, the two flow channel cut-off apparatuses 40 being provided with a valve element 40A for stopping the flow of water supply into the renovation operations area W, and valve operation means 40C for switching the valve element 40A between an open flow channel position inside an operations case 40B and a flow channel cut-off position in which the valve element 40A has moved inside the water supply pipe 1 through the through-hole 16 formed in the pipe wall; a step for connecting the bypass piping 41 across the operations case 40B of the flow channel cut-off apparatus 40; a step for attaching a cut-off-confirming split T-shaped pipe 46 for confirming that the inflow of water supply to the connecting pipe 4, which is a constituent member of the to-be-renovated pipeline assembly A, has been cut off; and a step for moving the valve element 40A of the two flow channel cut-off apparatuses 40 into the flow channel cut-off position inside the water supply pipe 1 through the openably operated sluice valve for operations D and the branching pipe 17C of the split T-shaped pipe 17, and through the through-hole 16 of the water supply pipe 1 to cut off two locations at the two ends of the renovation operations area W of the water supply pipe 1, so that the two pipe parts of the water supply pipe 1 positioned at the two ends of the renovation operations area W are placed in communication via the two operations cases 40B, the branching pipe 17C of the split T-shaped pipe 17, and the bypass piping 41.

A coupling flange 40D that is secured and coupled in a watertight state to the coupling flange 32F of the sluice valve for operations D via a plurality of bolts 8 and nuts 9 as an example of the fastening means is formed on the lower end of the operations case 40B of the flow channel cut-off apparatus 40; and a storage space 42 that is capable of accommodating the valve element 40A is formed by the internal space of the operations case 40B and the downstream-side flow channel (upper internal space) partitioned by the closeably operated valve element 31 in the valve flow channel (internal space) of the valve case 32.

Conventionally, various structures have been proposed as the valve operation means 40C of the flow channel cut-off apparatus 40, and in this embodiment, an elevating operation shaft 44 coupled to the valve element 40A is elevatably passed through and supported by in a watertight state an elevating guide member 43 disposed in a ceiling wall part 40b of the operations case 40B; and a jacking mechanism (not shown) for pressing the valve element 40A into the flow channel cut-off position against the water pressure is disposed between the operations case 40B and an operation rod 45, which is disposed at the upper end of the elevating operation shaft 44.

Also, the operation rod 45 of the elevating operation shaft 44 is lifted by a crane or the like in the case that the valve element 40A in a flow channel cut-off position is to be elevated to the open flow channel position inside the operations case 40B.

In the step for connecting the bypass piping 41 across the operations case 40B of the two flow channel cut-off apparatuses 40, the bypass piping 41 spanning the two operations cases 40B is configured by sequentially connecting an on-off valve 48, an elbow 49, a polyethylene pipe or another straight pipe 50, and a collar 51 for connecting together the ends of the straight pipe 50, to a connecting pipe 47 disposed in the two operations cases 40B, as shown in FIG. 21.

The cut-off-confirming split T-shaped pipe 46 is composed of an arcuate divided joint body 46A divided into three parts in the circumferential direction, and a connecting pipe part 46C provided with an on-off valve 46B is projectingly formed on the divided joint body 46A positioned on the upper side.

Next, when the cut-off-confirming split T-shaped pipe 46 is externally mounted and secured to the connecting pipe 4, a coupling flange 52A of a small drill 52 is secured and coupled in a watertight state to a coupling flange 46D at the distal end side of the connecting tube part 46C of the cut-off-confirming split T-shaped pipe 46; and a cutting tool of the drill 52 is sent through the openably operated on-off valve 46B of the cut-off-confirming split T-shaped pipe 46 and the connecting tube part 46C to form a through-hole in the pipe wall of the connecting pipe 4, as shown in FIG. 19.

The valve elements 40A of the two flow channel cut-off apparatuses 40 are switchably operated to the flow channel cut-off position in which the valve elements 40A are moved inside the water supply pipe 1 through the through-hole 16 formed in the pipe wall to stop the inflow of water supply to the renovation operations area W, and the on-off valve 46B of the cut-off-confirming split T-shaped pipe 46 is openably operated to check for the existence of water supply leakage.

At this point, a flow channel having a suitable size is ensured between the rear surface of the valve element 40A in the flow channel cut-off position and the internal peripheral surface of the through-hole 16 of the water supply pipe 1. Therefore, the two pipe parts of the water supply pipe 1 positioned at the two ends of the renovation operations area W are placed in communication via the branching pipe 17C of the split T-shaped pipe 17, the two operations cases 40B, and the bypass piping 41 when the two on-off valves 48 of the bypass piping 41 are openably operated.

(6) The operations step of FIG. 22 shows a step for separating and removing the to-be-renovated pipeline assembly A in the renovation operations area W of the water supply pipe 1, which constitutes a part of the circulatory piping system.

At this point, in this embodiment, a part of one of the water supply pipes 1 and a part of the other water supply pipe 1 are cut by a pipe cutting apparatus (not shown), and the to-be-renovated pipeline assembly A is separated and removed from the water supply pipe 1. Therefore, the entire length L of the to-be-renovated pipeline assembly A is a dimension that includes the cut pipe parts of the two water supply pipes 1.

After the flow channel has been cut off by the valve element 40A of the flow channel cut-off apparatus 40 disposed in two locations at the two ends of the renovation operations area W in the water supply pipe 1, and the flow of water supply to the renovation operations area W has been stopped, there is dislocating movement force toward the relative approaching side in the pipe axial center direction of the two remaining pipe parts 1A, 1B in which water supply pressure is acting via the valve element 40A of the flow channel cut-off apparatus 40 when the to-be-renovated pipeline assembly A in the renovation operations area W has been separated and removed, and the dislocating movement force is propagated from mutually opposite directions in relation to the rigid installation base 15 (two H-shaped steel sections) from the pipe holders 18 and the split T-shaped pipe 17 secured to the remaining pipe parts 1A, 1B, whereby the dislocating movement in the pipe axial center direction of the two remaining pipe parts 1A, 1B in which water supply pressure is acting can be effectively counterbalanced using the opposing remaining pipe part 1A or 1B of the counterpart side.

When the to-be-renovated pipeline assembly A in the renovation operations area W of the water supply pipe 1 is to be separated, the bolts 8 and nuts 9 that secure and couple together the pressing ring 7 externally mounted on one of the water supply pipes 1 and the coupling flange 2A of one end of the short pipe 2 are unfastened, the bolts 8 and nuts 9 that secure and couple together the pressing ring 7 externally mounted on the connecting pipe 4 and the coupling flange 5A of one end of the collar 5 are unfastened, and the bolts 8 and nuts 9 that secure and couple together the pressing ring 7 externally mounted on the other water supply pipe 1 and the coupling flange 5A of the other end of the collar 5 are unfastened. The collar 5 is thereafter slidably moved to the connecting pipe 4 side, the to-be-renovated pipeline assembly A is moved to the other water supply pipe 1 side, and one of the water supply pipes 1 and the short pipe 2 are unfitted, whereby the to-be-renovated pipeline assembly A can be separated from the water supply pipe 1 without cutting.

Figure 23:
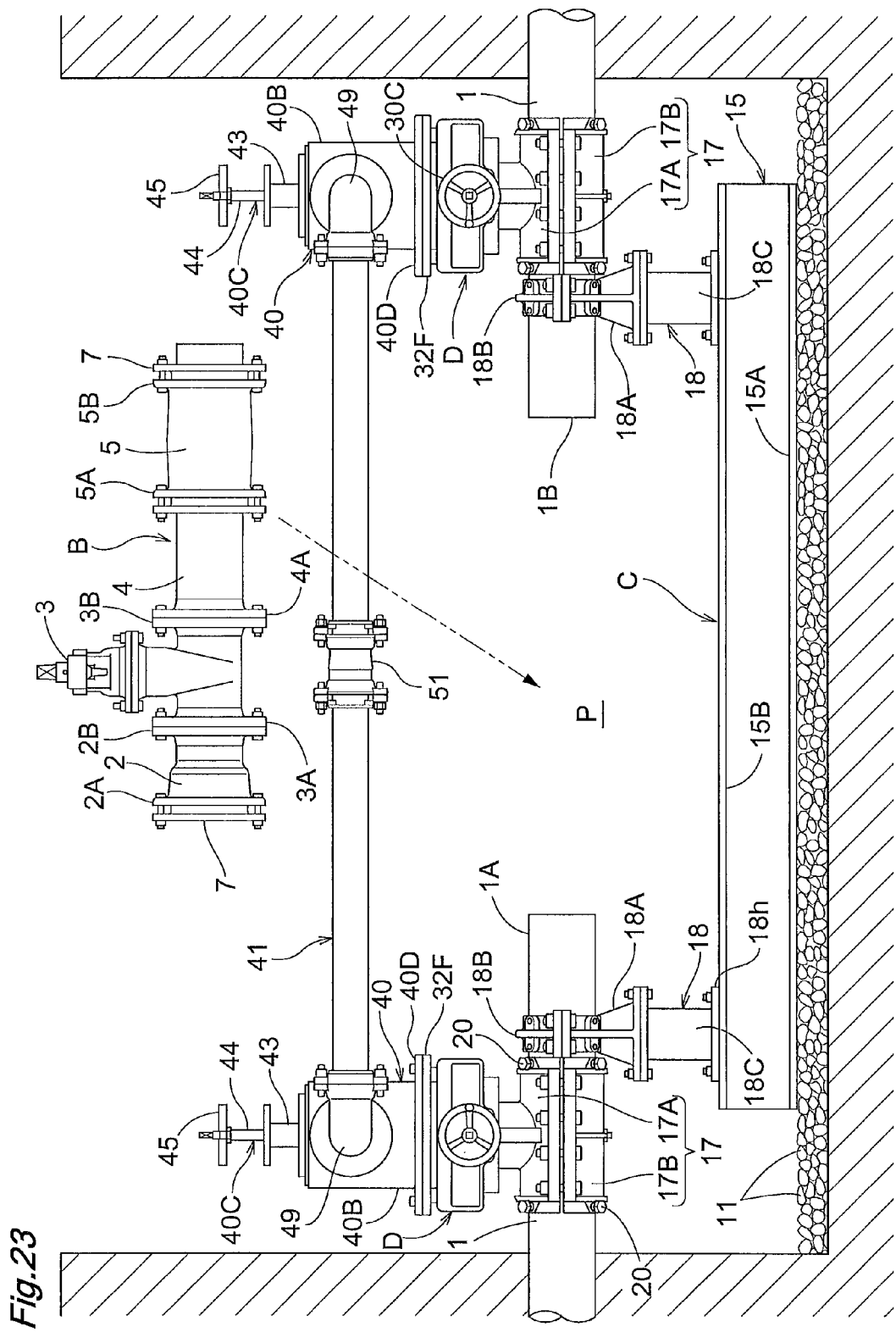
FIG. 23 is an overall side view of an instance when the new pipeline assembly is delivered.
Figure 24:
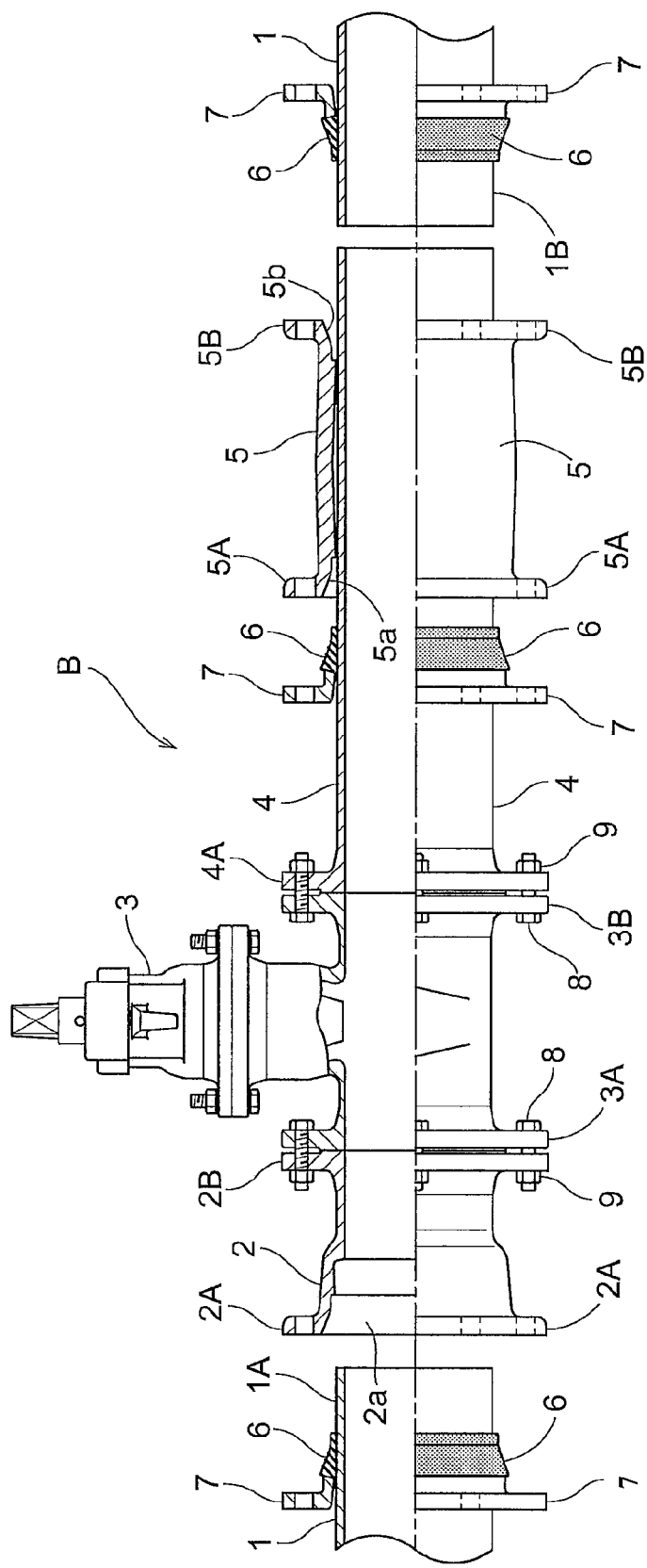
FIG. 24 is a half-sectional view of the main part of an instance when the new pipeline assembly has been arranged in a concentric state with respect to the two remaining pipe parts.
Figure 25:
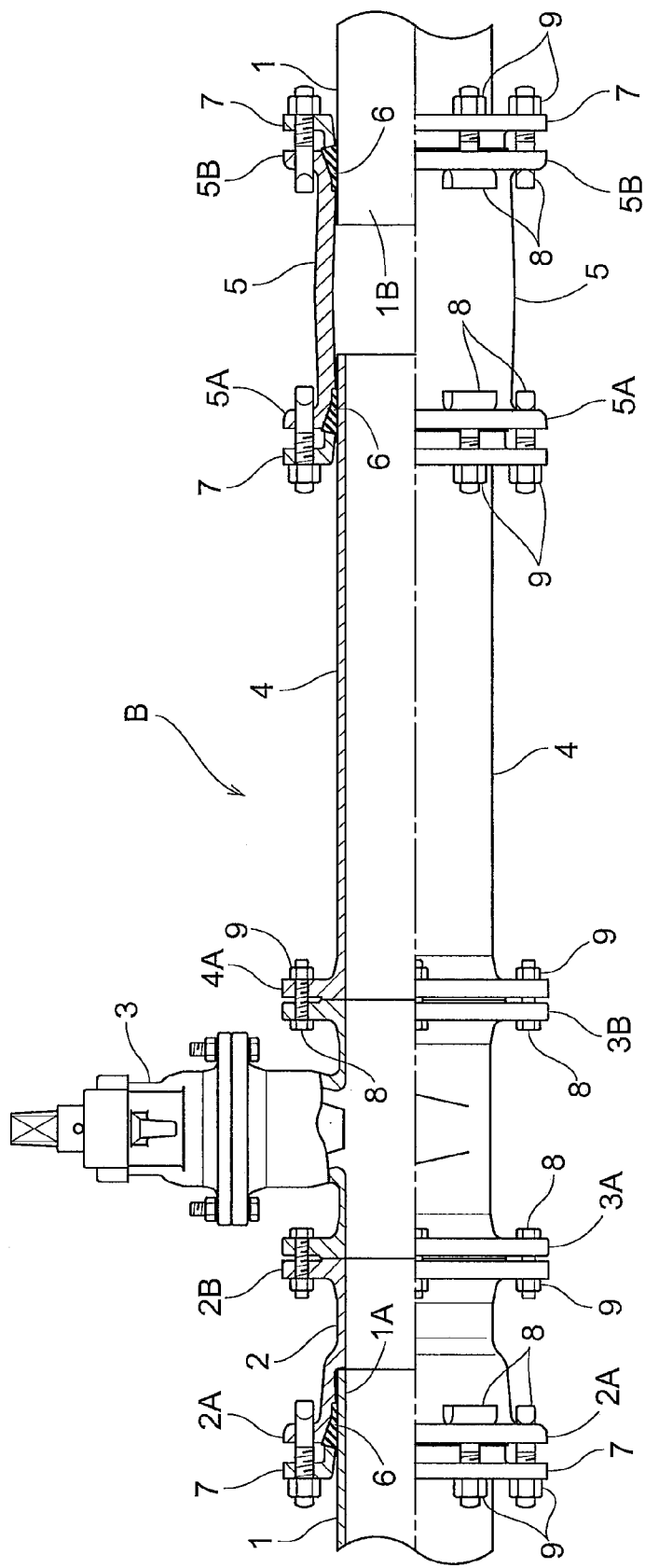
FIG. 25 is a half-sectional view of the main part of an instance when the connecting pipe of the new pipeline assembly and the other remaining pipe part have been connected by a collar.
Figure 26:
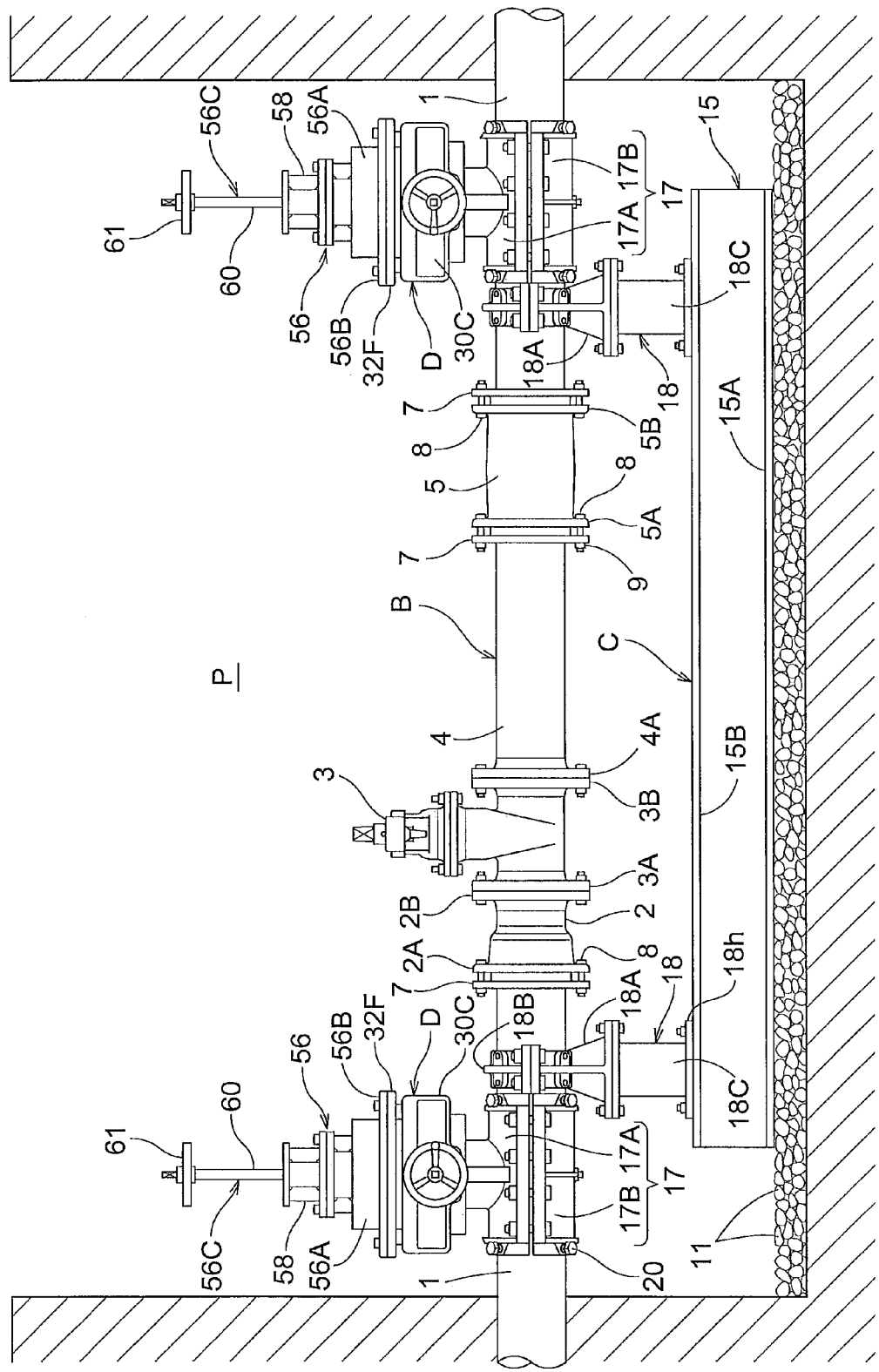
FIG. 26 is an overall side view of an instance when the cover-mounting machine is attached to the two sluice valves for operations.

(7) The operations steps of FIGS. 23 to 25 show a step for connecting the new pipeline assembly B to the two remaining pipe parts 1A, 1B of the water supply pipe 1 after removal.

The new pipeline assembly B is composed of a cast-iron short pipe 2 fittably connected in a watertight state to an end part of one of the cast-iron water supply pipes 1, a sluice valve 3 that is flange-joined in a watertight state to the other end part of the short pipe 2, a cast-iron connecting pipe 4 that is flange-joined in a watertight state to the other end part of the sluice valve 3, and a collar 5 that connects in a watertight state the other end part of the connecting pipe 4 and the end part of the other cast-iron water supply pipe 1.

The new pipeline assembly B arranged in a coaxial state facing the two remaining pipe parts 1A, 1B of the water supply pipe 1 after removal is moved to one water supply pipe 1 side, the receiving mouth of the short pipe 2 is fittably connected to the one remaining pipe part 1A of the water supply pipe 1, and the pressing ring 7 externally mounted on the water supply pipe 1 and the coupling flange 2A of one end of the short pipe 2 are fastenably secured by bolts 8 and nuts 9, or other fastening means, in a state in which the packing 6 interposed between the tapered internal peripheral surface 2a on the receiving mouth side of the short pipe 2 and the external peripheral surface of one of the water supply pipes 1, whereby the packing 6 is compressed to a watertight state by the pressing ring 7.

Next, the collar 5 is slidably operated to a position for fittably connecting to the remaining pipe part 1B of the other water supply pipe 1; the pressing ring 7 externally mounted on the connecting pipe 4 and the coupling flange 5A of one end of the collar 5 are thereafter fastenably secured by bolts 8 and nuts 9, or other fastening means, in a state in which the packing 6 is interposed between the tapered internal peripheral surface 5a of one end of the collar 5 and the external peripheral surface of the connecting pipe 4; and the pressing ring 7 externally mounted on the other water supply pipe 1 and the coupling flange 5B of the other end of the collar 5 are fastenably secured by bolts 8 and nuts 9, or other fastening means, in a state in which the packing 6 is interposed between the tapered internal peripheral surface 5b of the other end of the collar 5 and the external peripheral surface of the other water supply pipe 1. The packing 6 is thereby compressed to a watertight state by the pressing ring 7.

(8) The operations steps in FIGS. 26 to 29 show a step for switching the valve element 40A of the two flow channel cut-off apparatuses 40 from a flow channel cut-off position to an open flow channel position after the new pipeline assembly B has been connected, closeably operating the sluice valve for operations D, and removing the flow channel cut-off apparatus 40 from the coupling flange 32F of the sluice valve for operations D; a step for securing and coupling, in a watertight state, a cover-mounting apparatus 56 on the coupling flange 32F of the sluice valve for operations D, the cover-mounting apparatus 56 being provided with a cover body (an example of the fluid device E joined with the coupling flange 17D of the branching pipe 17C through the flow channel inside the valve case 32 of the sluice valve for operations D) 55 capable of sealing off the opening of the branching pipe 17C of the split T-shaped pipe 17; a step for attaching the cover body 55 of the cover-mounting apparatus 56 to the coupling flange 17D of the branching pipe 17C of the split T-shaped pipe 17 through the openably operated sluice valve for operations D; a step for removing the cover-mounting apparatus 56 from the coupling flange 32F of the sluice valve for operations D and furthermore removing the sluice valve for operations D from the coupling flange 17D of the split T-shaped pipe 17; and a step for removing the installation base 15 and the two pipe holders 18 from the work pit P.

A coupling flange 56B that is secured and coupled in a watertight state to the coupling flange 32F of the sluice valve for operations D via a plurality of bolts 8 and nuts 9 as an example of the fastening means is formed on the lower end of an operations case 56A of the cover-mounting apparatus 56; and an accommodation space 57 capable of storing the cover body 55 is formed by the internal space of the operations case 56A and the downstream-side flow channel (upper internal space) partitioned by the closeably operated valve element 31 in the valve flow channel (internal space) of the valve case 32.

The positioning bolt 53 is disposed in the coupling flange 17D of the split T-shaped pipe 17, and the positioning bolt 53 engages the screw hole 55a formed in the cover body 55 when the cover body 55 is lowered to a position in contact with the upper surface of the coupling flange 17D of the split T-shaped pipe 17. The coupling flange 32F and the cover body 55 are secured and coupled together in a watertight state by the securing bolt 54, as shown in FIG. 29, when the mounting position of the cover body 55 in relation to the coupling flange 32F has been confirmed.

Conventionally, various structures have been proposed as elevating operation means 56C for switching the cover body 55 between a standby position inside the operations case 56A and a cover-mounted position in contact with the upper surface of the coupling flange 17D of the split T-shaped pipe 17, and in this embodiment, an elevating operation shaft 60 coupled to a cover-holding member 59 for detachably holding the cover body 55 is elevatably passed through and made to support in a watertight state an elevating guide member 58 disposed in a ceiling wall part 56a of the operations case 56A; and a jacking mechanism (not shown) for pressing the cover body 55 into the cover-mounted position against the water pressure is disposed between the operations case 56A and an operation rod 61, which is disposed at the upper end of the elevating operation shaft 60.

Also, the operation rod 61 of the elevating operation shaft 60 is lifted by a crane or the like in the case that the cover-holding member 59 in the cover-mounted position is to be elevated to the standby position inside the operations case 56A.

Figure 30:
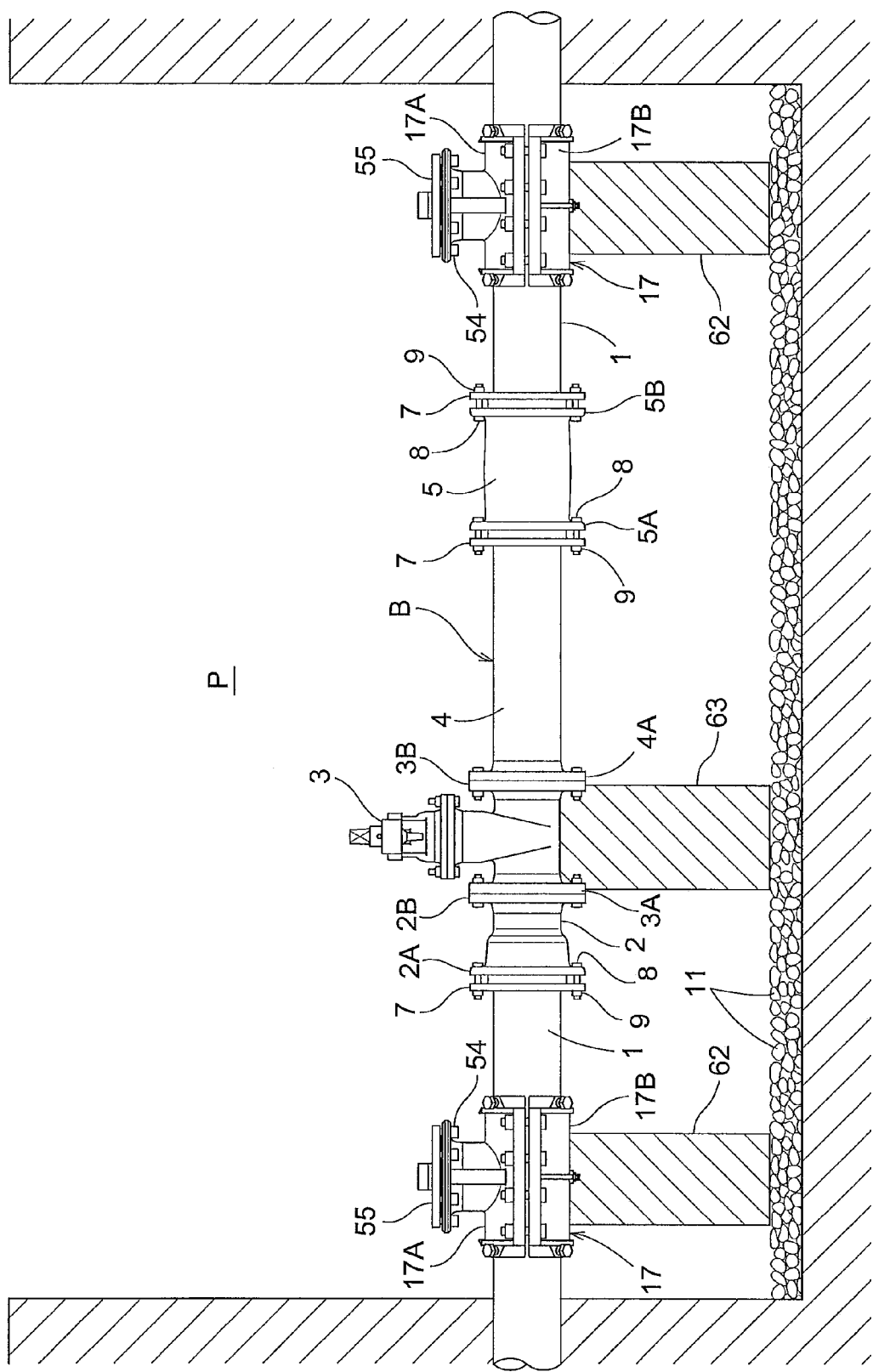
FIG. 30 is an overall side view of an instance when a concrete strut has been built.

(9) The operations step of FIG. 30 is a step for building an auxiliary support structure in the case that there is a possibility that the pipeline constituent members in the renovation operations area W of the water supply pipe 1 facing the work pit P will bend and deform under their own weight; and filling the work pit P after the support structure has been built.

The step for building a support structure is omitted and the work pit P is filled in when there is no possibility that the pipeline constituent members in the renovation operations area W of the water supply pipe 1 will bend and deform under their own weight, or when the amount of bending deformation is low and there is no need to provide support.

As an example of the steps for building a support structure, in this embodiment, the method comprises a step for building a concrete strut 62 and for supporting the lower surface of the split T-shaped pipe 17, on the operations bottom surface of the work pit P; and a step for building a concrete strut 63 for supporting the lower surface of the sluice valve 3, on the operations bottom surface of the work pit P.

It is possible to use steel, wood, or other rectangular material in place of the two concrete struts 62, 63.

In this embodiment, the renovation method is a method in which the to-be-renovated pipeline assembly A that constitutes a part of a circulatory piping system of the piping system for a water supply pipe, which is an example of a fluid pipe, is replaced by a new pipeline assembly B. Therefore, the two remaining pipe parts 1A, 1B of the water supply pipe 1 from which the to-be-renovated pipeline assembly A has been separated and removed are filled with water supply (clean water) even without the bypass piping 41 being disposed.

However, bypass piping 41 for maintaining the flow of water supply must be disposed in the case that a plurality of locations of the circulatory piping system are cut off due to construction.

Bypass piping 41 is not required to be disposed in the case of renovation construction that does not cause a problem when the fluid is temporarily cut-off (water stoppage) in a piping system through which a fluid is flowing in a single direction.

In this case as well, when the flow channel has been cut off by the valve element 40A of the flow channel cut-off apparatus 40 disposed in two locations at the two ends of the renovation operations area W in the fluid pipe (water supply pipe) 1 to stop the inflow of fluid into the renovation operations area W, and the to-be-renovated pipeline assembly A in the renovation operations area W has thereafter been separated and removed, there is a dislocating movement force in the pipe axial center direction of the upstream-side remaining pipe part 1A to which fluid pressure is being applied via the upstream-side valve element 40A, and the dislocating movement force is propagated from one of the split T-shaped pipes 17 and the pipe holders 18 secured to the upstream-side remaining pipe part 1A to the rigid installation base 15 (two H-shaped steel sections), and is further propagated from the installation base 15 to the downstream-side remaining pipe part 1B via the other split T-shaped pipe 17 and the pipe holder 18 secured to the downstream-side remaining pipe part 1B, whereby the dislocating movement in the pipe axial center direction of the upstream-side remaining pipe part 1A to which fluid pressure is being applied can be effectively counterbalanced using the opposing downstream-side remaining pipe part 1B.

Second Embodiment

Figure 31:
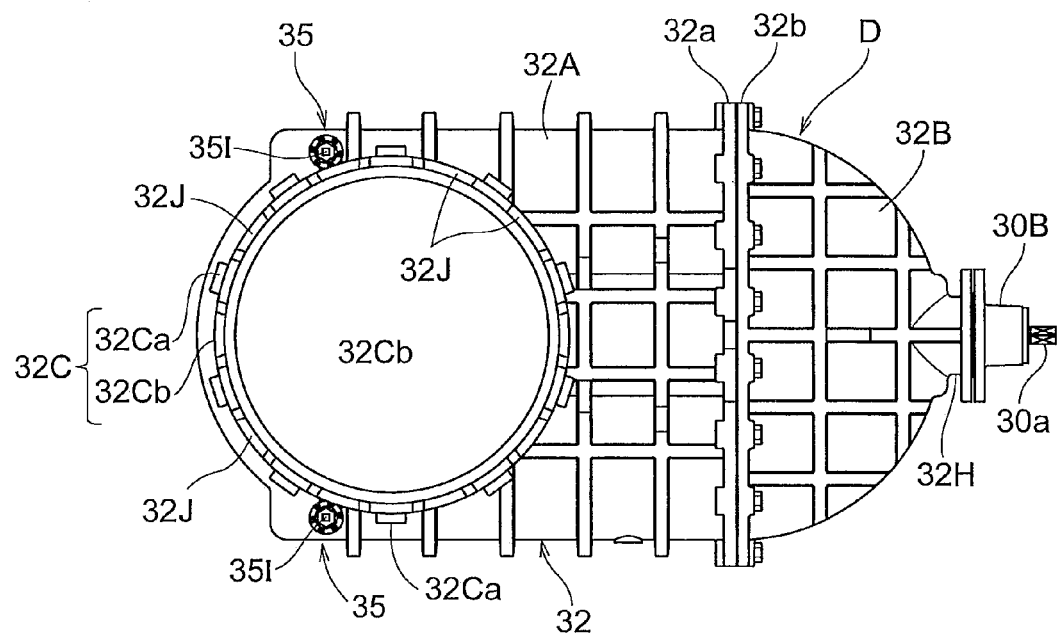
FIG. 31 is a bottom view of the sluice valve for operations showing a second embodiment of the present invention.
Figure 32:
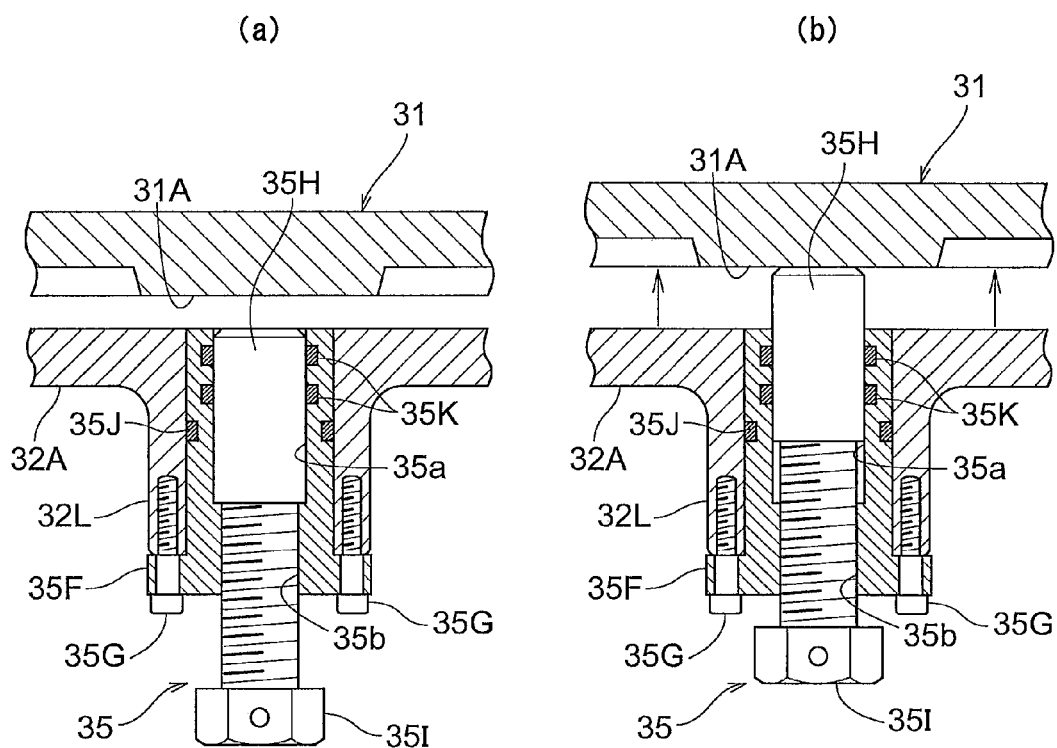
FIG. 32 is an enlarged cross-sectional view showing the pressing and non-pressing states of the pressing means disposed in the sluice valve for operations.

FIGS. 31 and 32 show another embodiment of the pressing means 35 for imparting downstream-side pressing movement force to the other surface on the upstream side of the valve element 31 in a closed-valve position, and pressing the O-ring 34 mounted in the seal holding groove 31b of the valve element 31 against the valve seat 32I inside the valve case 32.

The pressing means 35 is configured so that a second bearing part 32L that projects outward in a state passing through the valve case 32 in the vertical direction is formed on the lower wall facing the opening and closing movement pathway of the valve element 31 inside the valve case 32 and in an area that faces the two sliding parts 31A of the valve element 31 in a closed valve position; and a bushing 35F that communicably forms a mounting hole 35a and a screw hole 35b that opens inside the valve case 32 is fastenably secured to the second bearing part 32L by a locking screw 35G in a state of having been inserted from the lower side.

A lift shaft 35H capable of lifting the lower surface of the two sliding parts 31A of the valve element 31 is elevatably mounted in the mounting hole 35a of the bushing 35F; and an elevating operation screw 35I for elevatably operating the lift shaft 35H mounted in the mounting hole 35a is threaded into the screw hole 35b of the bushing 35F.

The elevating operation screw 35I is threadably operated and can thereby be made to change between a non-pressing state in which the upper end of the lift shaft 35H is set at a distance below the lower surface of the two sliding parts 31A of the valve element 31, and a pressing state in which the lift shaft 35H is elevatably moved to a closed-valve position in which the O-ring 34 mounted in the seal holding groove 31b of the valve element 31 is pressed against the valve seat 32I of the valve case 32 in a watertight state.

An O-ring 35J for providing a watertight seal with the internal peripheral surface of the second bearing part 32L is mounted in the seal-holding groove formed in one location in the external peripheral surface of the bushing 35F; and O-rings 35K for providing a watertight seal with the external peripheral surface of the lift shaft 35H are mounted in the seal-holding grooves formed in two locations in the internal peripheral surface of the bushing 35F.

The configuration is otherwise the same as the configuration described in the first embodiment above. Therefore, the same reference numerals as those of the first embodiment are used for the same constituent locations and a description thereof is omitted.

Third Embodiment

FIGS. 33 to 36 show the latter half of the step of the method for forming a through-hole 16 as the valve insertion port in a specific location (sluice valve installation location) of the water supply pipe, which is an example of the fluid pipe, in a state of nonstop water supply in which the flow of water supply (clean water) is maintained, and installing a sluice valve F (an example of the fluid device E joined with the coupling flange 17D of the branching pipe 17C through the flow channel inside the valve case 32 of the sluice valve for operations D) provided with a sluice valve element 70 for closing (cutting off) the flow channel of the water supply pipe 1 through the through-hole 16. The first half of the step up to forming the through-hole 16 in the pipe wall of the water supply pipe 1 is described with reference to the FIGS. 5 and 18 of the first embodiment.

(1) A split T-shaped pipe 17 (the shape and number of divisions is slightly different from the split T-shaped pipe 17 described in the first embodiment, but the structure and function are substantially the same; therefore, the same reference numerals as those used in the description of the first embodiment are used and a description thereof is omitted) divided into three parts in positions along the horizontal plane that passes near or through the pipe axial center of the water supply pipe 1 is externally mounted and secured in the sluice valve installation location of the water supply pipe 1, as an example of the pipe joint provided with a branching pipe 17C in an area that corresponds to the through-hole 16 formed in the pipe wall of the water supply pipe 1.

When the step for attaching the split T-shaped pipe 17 is completed, a flange cover (not shown) for sealing the upper opening of the branching pipe 17C in a watertight state is attached to the coupling flange 17D of the upper end of the branching pipe 17C, and water is injected at a pressure that corresponds to water supply pressure into the internal space between the internal peripheral surface of the split T-shaped pipe 17 and the external peripheral surface of the water supply pipe 1 to carry out a water pressure test in order to check for the existence of leaks.

When the step for testing water pressure is completed, the valve case 32 of the sluice valve for operations D (the structure is the same as that of the sluice valve for operations D described in the first embodiment; therefore, the same reference numerals as those used in the description of sluice valve for operations D of the first embodiment are used and a description thereof is omitted) provided with the valve element 31, which is openably and closeably actuated in the horizontal direction by the rotation operation of the valve operation means 30, is secured and coupled in a watertight state to the coupling flange 17D in the branching pipe 17C of the split T-shaped pipe 17.

(2) Next, the casing 27B of the drill 27 provided with the cylindrical rotary cutter (hole saw) 27A as an example of a cutting tool is secured and coupled in a watertight state to the coupling flange 32F formed on the upper part of the valve case 32 of the sluice valve for operations D. A cylindrical rotary cutter 27A of the drill 27 is sent through the openably operated sluice valve for operations D and the branching pipe 17C of the split T-shaped pipe 17 to form a circular through-hole 16 in the pipe wall of the water supply pipe 1. The cylindrical rotary cutter 27A is withdrawn into the accommodation space 28 and the sluice valve for operations D is thereafter closeably operated. The drill 27 is then removed from the coupling flange 32F of the sluice valve for operations D.

(3) As shown in FIG. 33, an externally-threaded screw part formed on the bearing part 72a on the upper end of the valve case 72 of the sluice valve F is threadably coupled to an internally-threaded screw part of a suspended coupling member 71D attached to the lower end of an elevating operation shaft 71B of an operations case 71 provided with a coupling flange 71A secured and coupled in a watertight state to the coupling flange 32F of the sluice valve for operations D via a plurality of the bolts 8 and nuts 9 as an example of fastening means, and an elevating guide member 71C that passes through and elevatably supports the elevating operation shaft 71B in a watertight state. The operations case 71 in which the sluice valve F is assembled is thereafter suspendably transported above the sluice valve for operations D by a crane or the like, and the coupling flange 71A of the operations case 71 and the coupling flange 32F of the sluice valve for operations D are secured and coupled in a watertight state.

The valve case 72 is composed of a valve case main body 72A and a valve cover 72B, the valve case main body 72A having a coupling flange 72b that is formed on the lower end and that is secured and coupled in a watertight state to the coupling flange 17D of the split T-shaped pipe 17 by the securing bolt 54, and the valve cover 72B being secured and coupled in a watertight state to a coupling flange 72c formed on the upper end of the valve case main body 72A. A valve stem 73 of the sluice valve element 70 is passed through and supported in a watertight state by the bearing part 72a of the valve cover 72B.

(4) As shown in FIG. 34, a jacking mechanism (not shown) for pressing the valve case 72 of the sluice valve F and the sluice valve element 70 into a predetermined mounted position against the water pressure is disposed between the operations case 71 and an operation rod 74, which is disposed at the upper end of the elevating operation shaft 71B, after which the sluice valve for operations D is openably operated. The jacking mechanism is elevatably operated to lower the lower coupling flange 72b of the valve case 72 inside the operations case 71 through the internal flow channel of the sluice valve for operations D to a position in contact on the coupling flange 17D of the split T-shaped pipe 17.

A positioning bolt 53 that engages a screw hole 72d formed in the lower coupling flange 72b of the valve case 72 is disposed in the coupling flange 17D of the split T-shaped pipe 17, and at this point the mounting position of the valve case 72 in relation to the coupling flange 17D of the split T-shaped pipe 17 is automatically corrected and fixed in a predetermined mounting position by the positioning guidance effect of the positioning bolt 53.

When the mounting position of the valve case 72 in relation to the coupling flange 17D of the split T-shaped pipe 17 has been fixed, the positioning bolt 53 is removed and replaced by the securing bolt 54 to secure and couple the coupling flange 17D and the valve case 72 in a watertight state, as shown in FIG. 35. At this point, the operation for removing the positioning bolt 53 and the operation for securing the securing bolt 54 are carried out using one or more of a plurality of operation recesses 32J formed in the coupling flange 17D.

When the coupling flange 17D and the valve case 72 have been secured and coupled, the operations case 71 is removed from the coupling flange 32F of the sluice valve for operations D and the sluice valve for operations D is removed from the coupling flange 17D of the split T-shaped pipe 17.

Fourth Embodiment

FIGS. 36 to 41 show another embodiment of the sluice valve for operations D. An operation recess 32J in a shape of a cutout is formed between adjacent screw holes 33B of the pulling and securing means 33 in the lower coupling tube part 32C of the valve case 32, the operation recess 32J being used for operating the securing bolt (an example of a fastener) 54 from the lower surface (rear surface) of the coupling flange 17D, and the securing bolt 54 being used for securing and coupling the fluid device E (e.g., the cover body 55 capable of sealing the opening of the branching pipe 17C of the split T-shaped pipe 17 in a watertight state, as shown in FIGS. 27 and 28; or the valve case 72 of the sluice valve F, as shown in FIGS. 33 to 35) that is joined with the coupling flange 17D of the branching pipe 17C through the flow channel inside the valve case 32. The two inside corners of the operation recesses 32J are arcuately formed.

The configuration is otherwise the same as the configuration described in the first embodiment above. Therefore, the same reference numerals as those of the first embodiment are used for the same constituent locations and a description thereof is omitted.

Other Embodiments (1) In the embodiments described above, the pulling and securing means 33 is configured so that the bolt 33A is threaded from the outer side in the radial direction of the pipe into the screw hole 33B formed in a plurality of locations in the circumferential direction of the lower coupling tube part 32C of the valve case 32, the bolt 33A being provided with a tapered pressing surface 33a that is in contact from the horizontal direction with the tapered surface 17d formed on the external peripheral edge of the lower surface (rear surface) of the coupling flange 17D. However, no limitation is imposed by this configuration, and it is also possible to pull and secure the valve case 32 to the coupling flange 17D using a cam mechanism, a screw mechanism, or other pulling and securing means.

(2) In the embodiments described above, the branching pipe 17C of the split T-shaped pipe 17 externally mounted and secured on the water supply pipe 1 is used as an example of the connecting pipe, but the connecting pipe may be a branching pipe that is integrally formed with the water supply pipe 1, or may be the pipe end part of the water supply pipe.

In other words, the connecting pipe may be a connecting pipe that is provided with a coupling flange on which the coupling tube part 32C of the valve case 32 can be externally mounted from the pipe axial center direction.

(3) In the embodiments described above, the valve case 32 is bisected so as to allow separation in a position that traverses in the crosswise direction the two sliding parts 31A of the valve element 31 in the open valve position, but it is also possible to divide the valve case 32 into three parts or more, and to configure the opening of at least one of the divided valve case bodies to be an opening that allows the valve element 31 to be removed to the exterior.

(4) In the embodiment described above,
An operation recess 32J is formed in a plurality of locations in the circumferential direction of the lower coupling tube part 32C of the valve case 32, the operation recess 32J being used for threadably operating the securing bolt 54 from the lower surface (rear surface) of the coupling flange 17D, and the securing bolt 54 being an example of a fastener for securing and coupling the fluid device E that is joined with the coupling flange 17D of the branching pipe 17C through the flow channel inside the valve case 32. However, the operation recess 32J may be formed in an area that corresponds to the arrangement location of the securing bolt 54.

The number of operation recesses 32J may be lower than the arranged number of securing bolts 54 in the case that the operation recess 32J is of considerable length in the circumferential direction.

INDUSTRIAL APPLICABILITY

The present invention can be applied to a sluice valve for operations that is mainly used in the case that, e.g., a cover body for sealing off an end part opening of a connecting pipe, or a valve case of a sluice valve or other fluid device is attached to a coupling flange formed on an end part of a branching pipe or another connecting pipe while the flow of a fluid in the pipe is maintained.

REFERENCE SIGNS LIST

E Fluid device
F Sluice valve
16 Through-hole
17 Pipe joint (split T-shaped pipe)
17A Divided joint body (upper side divided joint body)
17B Divided joint body (lower side divided joint body)
17C Connecting pipe (branching pipe)
17D Coupling flange
30 Valve operation means
31 Valve element
32 Valve case
32A Divided valve case body (first divided valve case body)
32B Divided valve case body (second divided valve case body)
32C Coupling tube part (lower side coupling tube part)
32Ca First peripheral wall portion
32Cb Second peripheral wall portion
32I Valve seat
32J Operation recess
33 Pulling and securing means
33A Bolt
54 Fastener (securing bolt)

55 Cover body
72 Valve case

The invention claimed is:

1. A sluice valve for operations in which a valve element that is freely movable in a direction orthogonal to a pipe axial center and valve operation means for movably operating the valve element between a closed valve position and an open valve position are provided to a valve case, which is provided with a coupling tube part that can be is externally mounted on a coupling flange of a connecting pipe from the pipe axial center direction; and pulling and securing means for pulling and securing the valve case to the coupling flange is disposed on the coupling tube part of the valve case;

the sluice valve for operations having an operation recess formed on the coupling tube part of the valve case, and adapted for operating a fastener from a rear surface side of the coupling flange, the fastener being used for securing and coupling the coupling flange and a fluid device, which fluid device is joined to the coupling flange through a flow channel inside the valve case wherein a thickness of a first peripheral wall portion of the coupling tube part of the valve case is configured to be greater than a thickness of a second peripheral wall portion, the first peripheral wall portion being formed in the shape of a strip or substantially in the shape of a strip along the pipe axial center direction in a state that includes a location in which the pulling and securing means is attached, and the second peripheral wall portion being formed in the shape of a strip or substantially the shape of a strip along the pipe axial center direction in a state that includes a location in which the operation recess is formed.

2. The sluice valve for operations according to claim 1, wherein the connecting pipe is composed of a branching pipe of a pipe joint, the pipe joint being provided with a plurality of divided joint bodies detachably secured and coupled along the circumferential direction of a fluid pipe, and the branching pipe, which communicates with a through-hole in the fluid pipe, being projectingly provided to one of the divided joint bodies.

3. The sluice valve for operations according to claim 2, wherein a seal material is detachably mounted on a downstream-side surface among two surfaces of the valve element in the pipe axial center direction, the seal material sealing off a space formed with respect to a valve seat inside the valve case that faces, in the pipe axial center direction, one surface of the valve element in a closed valve position; and the valve case is composed of at least a plurality of divided valve case bodies separably divided in a position in which is formed an opening via which the valve element is removed to the exterior.

4. The sluice valve for operations according to claim 2, wherein the pulling and securing means is composed of a bolt threaded from the exterior in the radial direction of the pipe in a plurality of locations in the circumferential direction of the coupling tube part; and the operation recess is formed in a medial location between adjacent bolts of the coupling tube part.

5. The sluice valve for operations according to claim 2, wherein an inside surface of the first peripheral wall portion of the coupling tube part and an inside surface of the second peripheral wall portion are formed as an inside peripheral surface having the same inside diameter.

6. The sluice valve for operations according to claim 1, wherein a seal material is detachably mounted on a downstream-side surface among two surfaces of the valve element in the pipe axial center direction, the seal material sealing off a space formed with respect to a valve seat inside the valve case that faces, in the pipe axial center direction, one surface of the valve element in a closed valve position; and the valve case is composed of at least a plurality of divided valve case bodies separably divided in a position in which is formed an opening via which the valve element is removed to the exterior.

7. The sluice valve for operations according to claim 6, wherein the pulling and securing means is composed of a bolt threaded from the exterior in the radial direction of the pipe in a plurality of locations in the circumferential direction of the coupling tube part; and the operation recess is formed in a medial location between adjacent bolts of the coupling tube part.

8. The sluice valve for operations according to claim 6, wherein an inside surface of the first peripheral wall portion of the coupling tube part and an inside surface of the second peripheral wall portion are formed as an inside peripheral surface having the same inside diameter.

9. The sluice valve for operations according to claim 6, wherein there is disposed in the valve case pressing means for imparting downstream-oriented pressing and moving force to another upstream side surface of the valve element in the closed valve position to bring the valve element into contact under pressure with the valve seat in the valve case.

10. The sluice valve for operations according to claim 9, wherein the pulling and securing means is composed of a bolt threaded from the exterior in the radial direction of the pipe in a plurality of locations in the circumferential direction of the coupling tube part; and the operation recess is formed in a medial location between adjacent bolts of the coupling tube part.

11. The sluice valve for operations according to claim 9, wherein an inside surface of the first peripheral wall portion of the coupling tube part and an inside surface of the second peripheral wall portion are formed as an inside peripheral surface having the same inside diameter.

12. The sluice valve for operations according to claim 1, wherein the pulling and securing means is composed of a bolt threaded from the exterior in a radial direction of the pipe in a plurality of locations in the circumferential direction of the coupling tube part; and the operation recess is formed in a medial location between adjacent bolts of the coupling tube part.

13. The sluice valve for operations according to claim 12, wherein an inside surface of the first peripheral wall portion of the coupling tube part and an inside surface of the second peripheral wall portion are formed as an inside peripheral surface having the same inside diameter.

14. The sluice valve for operations according to claim 1, wherein an inside surface of the first peripheral wall portion of the coupling tube part and an inside surface of the second peripheral wall portion are formed as an inside peripheral surface having the same inside diameter.

15. The sluice valve for operations according to claim 14, wherein the first peripheral wall portion is formed in a plurality of locations in the circumferential direction of the coupling tube part of the valve case, the second peripheral wall portion is arranged between adjacent first peripheral wall portions, and the length of the second peripheral wall portion in the circumferential direction is configured to be greater than a length of the operation recess in the circumferential direction.

* * * * *

UNITED STATES PATENT AND TRADEMARK OFFICE
CERTIFICATE OF CORRECTION

PATENT NO. : 9,004,090 B2  
APPLICATION NO. : 13/389657  
DATED : April 14, 2015  
INVENTOR(S) : Hisakazu Asai Page 1 of 1

It is certified that error appears in the above-identified patent and that said Letters Patent is hereby corrected as shown below:

In the Claims

Column 25, Line 9, Claim 1, after "that" delete "can be"

Signed and Sealed this  
First Day of September, 2015

Michelle K. Lee  
*Director of the United States Patent and Trademark Office*